(12) United States Patent
Rahn et al.

(10) Patent No.: US 9,219,550 B2
(45) Date of Patent: Dec. 22, 2015

(54) FORWARD CARRIER RECOVERY USING FORWARD ERROR CORRECTION (FEC) FEEDBACK

(75) Inventors: Jeffrey T. Rahn, Sunnyvale, CA (US); Gilad Goldfarb, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 1032 days.

(21) Appl. No.: 13/167,423

(22) Filed: Jun. 23, 2011

(65) Prior Publication Data

US 2012/0328305 A1 Dec. 27, 2012

(51) Int. Cl.
*H04B 10/06* (2006.01)
*H04B 10/61* (2013.01)
*H04L 1/00* (2006.01)

(52) U.S. Cl.
CPC ............ *H04B 10/616* (2013.01); *H04L 1/0047* (2013.01)

(58) Field of Classification Search
CPC ........ H04B 10/00; H04B 10/02; H04B 10/04; H04B 10/06; H04B 10/08
USPC .......................................... 398/208, 206, 205
See application file for complete search history.

(56) References Cited

U.S. PATENT DOCUMENTS

| | | | | |
|---|---|---|---|---|
| 4,575,862 A * | 3/1986 | Tahara et al. | ................. | 375/349 |
| 4,601,005 A * | 7/1986 | Kilvington | ........................ | 708/3 |
| 6,222,879 B1 * | 4/2001 | Cideciyan et al. | ............ | 375/233 |
| 6,539,205 B1 * | 3/2003 | Wan et al. | ...................... | 370/465 |
| 7,158,567 B2 | 1/2007 | Wang et al. | .................... | 375/232 |
| 7,869,716 B1 * | 1/2011 | Boroditsky et al. | ........... | 398/159 |
| 8,335,438 B2 * | 12/2012 | Kim et al. | ...................... | 398/154 |
| 8,472,515 B1 * | 6/2013 | Savoj | ............................. | 375/233 |
| 2002/0044322 A1 * | 4/2002 | Blumenthal et al. | .......... | 359/161 |
| 2003/0016767 A1 * | 1/2003 | Houtman | ........................ | 375/326 |
| 2003/0067974 A1 * | 4/2003 | Haunstein et al. | ............. | 375/229 |
| 2003/0191601 A1 * | 10/2003 | Lai | ................................ | 702/117 |
| 2004/0224657 A1 * | 11/2004 | Matsusaka | ................. | 455/278.1 |
| 2005/0025482 A1 * | 2/2005 | Richards et al. | ................ | 398/65 |
| 2006/0068697 A1 * | 3/2006 | Tanabe et al. | ..................... | 455/1 |
| 2007/0092260 A1 * | 4/2007 | Bontu et al. | .................. | 398/152 |
| 2008/0089700 A1 * | 4/2008 | Takahashi | ..................... | 398/208 |
| 2009/0028075 A1 * | 1/2009 | Zhang et al. | .................. | 370/290 |
| 2009/0060497 A1 * | 3/2009 | Way | ................................ | 398/27 |

(Continued)

OTHER PUBLICATIONS

Erza Ip et al., "Coherent detection in optical fiber systems", Sanford University, vol. 16, No. 2, Jan. 21, 2008, pp. 753-791.

(Continued)

*Primary Examiner* — David Payne
*Assistant Examiner* — Pranesh Barua
(74) *Attorney, Agent, or Firm* — Harrity & Harrity LLP; David L. Soltz

(57) ABSTRACT

A system receive, from an optical receiver, a signal derived from a first optical signal and a second optical signal generated by a local oscillator, that includes a first component that is an in-phase component and a second component that is a quadrature phase component; filter the signal, using a filter, set to one or more configurations, to obtain one or more recovered signals, where each of the recovered signals includes a respective quantity of noise; perform forward error correction, on the recovered signals, to obtain one or more quantities of bit errors that correspond to the recovered signals; and process the signal using the filter set to a particular configuration, of the one or more configurations, that corresponds to a lowest quantity of bit errors of the one or more quantities of bit error.

26 Claims, 9 Drawing Sheets

(56) References Cited

U.S. PATENT DOCUMENTS

| | | | |
|---|---|---|---|
| 2010/0157158 A1* | 6/2010 | Wang et al. | 348/571 |
| 2010/0183165 A1* | 7/2010 | Sato | 381/71.11 |
| 2010/0183294 A1* | 7/2010 | Villarruel et al. | 398/10 |
| 2010/0209121 A1* | 8/2010 | Tanimura | 398/202 |
| 2010/0329697 A1* | 12/2010 | Koizumi et al. | 398/208 |
| 2011/0167314 A1* | 7/2011 | Gerstel et al. | 714/752 |
| 2011/0274436 A1* | 11/2011 | McNicol et al. | 398/140 |
| 2012/0057627 A1* | 3/2012 | Chan et al. | 375/233 |
| 2012/0072802 A1* | 3/2012 | Chinnici et al. | 714/758 |
| 2012/0155575 A1* | 6/2012 | Laporte | 375/340 |
| 2012/0250785 A1* | 10/2012 | Vidal et al. | 375/295 |
| 2013/0045015 A1* | 2/2013 | Kuschnerov et al. | 398/208 |

OTHER PUBLICATIONS

Ezra Ip et al., "Coherent Detection in Optical Fiber Systems", Optic Express, Jan. 21, 2008, vol. 16, No. 2, pp. 753-791.

* cited by examiner

FORWARD CARRIER RECOVERY USING FORWARD ERROR CORRECTION (FEC) FEEDBACK

BACKGROUND

Coherent optical receivers process traffic, in the form of optical signals, received from an optical network. Coherent optical receivers process the optical signals by performing operations on the optical signals, such as polarization beam splitting, demodulation, analogue-to-digital conversion, etc. The processing usually includes coherent processing using a local oscillator that is matched to a carrier frequency that is generated by a remote oscillator in an optical transmitter.

Coherent optical receivers use a carrier recovery technique, such as feedforward carrier recovery (FFCR), for tracking phase difference between the remote and local oscillators. The difference in phase (e.g., phase noise) may be associated with phase noise from the remote oscillator, the local oscillator, and/or the optical path (e.g., optical fiber) that interconnects the optical transmitter to the receiver. However, the performance, associated with the FFCR technique, is sensitive to how well a filter, used by the coherent optical receiver to smooth the recovered phase, is matched to the noise characteristics of the signal.

FFCR may, however, introduce cycle slips that are caused by a transient loss of phase lock, by a carrier recovery loop circuit, within the coherent optical receiver. The cycle slips can cause bit errors to occur when processing the signal. While the errors may be correctable, the cycle slips may increase a quantity of risk, associated with an occurrence of an uncorrectable frame and/or loss of data, as a result of a cycle slip.

SUMMARY

According to one implementation, a method, performed by a device, is provided. The method may include receiving, from an optical receiver, a signal, derived from a first optical signal and a second optical signal generated by a local oscillator, that includes a first component that is an in-phase component and a second component that is a quadrature phase component; and filtering the signal, using a filter set to one or more configurations, to obtain one or more recovered signals, where each of the one or more recovered signals include a respective quantity of noise. The method may also include performing forward error correction, on the one or more recovered signals, to obtain one or more quantities of bit errors that correspond to the one or more recovered signals; and processing the signal using the filter set to a particular configuration, of the one or more configurations, that corresponds to a lowest quantity of bit errors of the one or more quantities of bit error.

According to another implementation, a device may include one or more processors to receive, from an optical receiver, a signal derived from a first optical signal combined with a second optical signal that is generated by a local oscillator; obtain, from the signal, a first recovered signal using a filter that is set up in a first configuration, where the first recovered signal includes a first quantity of noise; and identify a first quantity of bit errors associated with the first recovered signal. The device may also include the one or more processors to obtain, from the signal, a second recovered signal using the filter that is set up in a second configuration, where the second recovered signal includes a second quantity of noise; identify a second quantity of bit errors associated with the second recovered signal; and process the signal using the filter set up in the first configuration or the second configuration based on whether the first quantity of errors is greater than the second quantity of errors.

According to a further implementation, a system may include one or more devices to receive a signal, derived from a first optical signal and a second optical signal, where the signal includes a first signal associated with a first polarization and a second signal, associated with a second polarization that is orthogonal to the first polarization; retrieve a first index to generate a first weighted average, of optical phase, associated with the first signal and a second weighted average, of the optical phase, associated with the second signal; filter the first signal and the second signal, using a filter that is set up based on the first weighted average, to generate a first recovered signal, and the second weighted average to generate a second recovered signal; and obtain a first and second bit error rate associated with the first recovered signal and the second recovered signal. The system may also include the one or more processors to retrieve a second index to generate a third weighted average, of the optical phase, associated with the first signal and a fourth weighted average, of the optical phase, associated with the second signal; filter the first signal and the second signal, using the filter that is set up based on the third weighted average, to generate a third recovered signal, and the fourth weighted average to generate the fourth recovered signal; obtain a third and fourth bit error rate associated with the third recovered signal and the fourth recovered signal, respectively; and process the first and second signals using the filter set to the first configuration or the second configuration based on whether a sum of the first bit error rate and the second bit error rate is greater than another sum of the third bit error rate and the fourth bit error rate.

DETAILED DESCRIPTION

The following detailed description refers to the accompanying drawings. The same reference numbers in different drawings may identify the same or similar elements. Also, the following detailed description does not limit the implementations.

Systems and/or methods, described herein, may include a technique for reducing affects of phase noise, associated with a signal received from a coherent optical receiver, based on a quantity of bit errors associated with the signal. As described herein, a FFCR device may dynamically tune a filter to change a quantity of phase noise that is associated with the signal. The FFCR device may communicate with a forward error correction (FEC) device to identify a manner in which a quantity of bit errors, associated with the signal, changes as a function the changing quantity of phase noise. The FFCR device may tune the filter in a manner that reduces the quantity of bit errors associated with the signal.

Systems and/or methods may enable the FFCR device to change a quantity of phase noise based on a weighted average of the phase noise associated with each constituent polarization component of the signal. The FFCR device may communicate with the FEC device to identify a manner in which a quantity of bit errors, associated with the components, changes as a function of the changing quantity of phase noise averaged between the components. The FFCR device may process each of the components in a manner that reduces the quantity of bit errors associated with the components.

The FFCR device may dynamically tune a first filter, for a first component, associated with a first polarization state, such as a transverse electric (TE) polarization state (e.g., that is parallel to an X-axis). The FFCR device may dynamically tune a second filter, for a second component, associated with a second polarization state, such as a transverse magnetic (TM) polarization state (e.g., that is parallel to a Y-axis, where the X- and Y-axes are orthogonal). The FFCR device may, in one example, process each of the first or second components independently. In another example, the FFCR device may process the signal based on a weighted average of the first component and/or the second component. The term average, as used herein, may include a numerical average, mean, median, mid-point, and/or a weighted average, weighted mean, etc.

Figure 1:
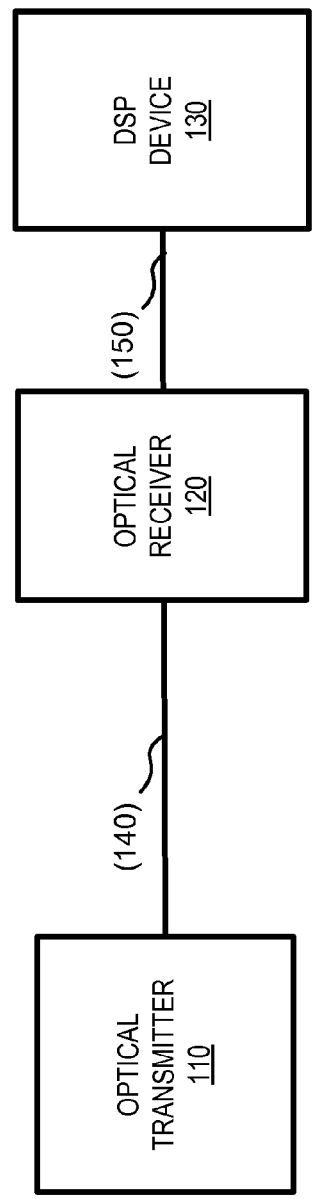
FIG. 1 is a block diagram of an example network in which systems and/or methods described herein may be implemented.

FIG. 1 is a block diagram of an example network 100 in which systems and/or methods described herein may be implemented. Network 100 may include an optical transmitter 110, an optical receiver 120, a digital signal processing (DSP) device 130, an optical network path 140 (hereinafter referred to as "optical path 140"), and an electrical network path 150 (hereinafter referred to as "electrical path 150").

The number of devices and/or paths, illustrated in FIG. 1, is provided for explanatory purposes. In practice, there may be additional devices and/or paths, fewer devices and/or paths, different devices and/or paths, or differently arranged devices and/or paths than illustrated in FIG. 1. Also, in some implementations, one or more of the devices of network 100 may perform one or more functions described as being performed by another one or more of the devices of network 100. For example, functions attributable to optical receiver 120 could be performed by DSP device 130 and/or by some other device.

Optical transmitter 110 may include one or more devices that generate and/or transmit an optical signal via optical path 140. Optical transmitter 110 may, in an example implementation, include one or more lasers that generate one or more optical signals. In another example implementation, optical transmitter 110 may include a modulator that modulates the one or more optical signals based on input electrical signals. In one example, optical transmitter 110 may modulate the optical signals using phase shift keying (PSK) phase modulation techniques. In yet another example implementation, optical transmitter 110 may include a multiplexer to multiplex the modulated optical signals (e.g., using wavelength-division multiplexing) for transmission to optical receiver 120 via optical path 140. Each of the optical signals may be associated with a different carrier wavelength as a result of the multiplexing.

Optical receiver 120 may include one or more devices that receive, convert, process, amplify, and/or demodulate electrical and/or optical signals in a manner described herein. In an example implementation, optical receiver 120 may be a coherent optical receiver that may receive and/or process phase modulated optical signals. Optical receiver 120 may, for example, receive an optical signal and may perform a polarization beam splitting operation to break the optical signal into a first optical signal associated with a first polarization and/or a second optical signal associated with a second polarization. The second polarization may, in one example, be orthogonal to the first polarization. Optical receiver 120 may process the first and/or second optical signals to generate a real component (e.g., an amplitude and/or in-phase (I) component) and/or an imaginary component (e.g., a phase and/or quadrature (Q) component) for each of the first optical signal and/or the second optical signal. Optical receiver 120 may demodulate the components, of the first and/or second optical signals, to create electrical signals. Optical receiver 120 may transmit the components, as electrical signals, to DSP device 130 via one or more electrical paths 150.

DSP device 130 may include one or more devices that receive, process, and/or perform other operations on the electrical signals, received from optical receiver 120, in a manner described herein. DSP device 130 may receive electrical signals from optical receiver 120 via electrical paths 150. DSP device 130 may perform a FFCR operation to identify and/or modify a quantity of phase noise associated with the electrical signals.

DSP device 130 may perform a carrier phase recovery operation to reduce affects of phase noise in one or more of the optical signals. DSP 130 may, for example, configure a filter, that is used to process the signals when performing the FFCR operation, to determine a manner in which to minimize a quantity of bit errors (e.g., based on a bit error rate) associated with the signals. DSP device 130 may perform other operations associated with forward error correction (FEC) on the electrical signals. DSP device 130 may determine a quantity of bit errors associated with a filtered signal and may generate a bit error rate associated with the filtered signal.

Optical path 140 may include a network path that is capable of transporting an optical signal. In an example implementation, optical path 140 may be a fiber optic cable via which an optical signal is transported, from optical transmitter 110, to optical receiver 120. Optical path 140 may include non-linear characteristics that introduce a quantity of noise (e.g., phase noise, polarization modal dispersion, and/or other types of noise) into the optical signal when transporting the optical signal to optical receiver 120.

Electrical path 150 may include a network path that is capable of transporting an electrical and/or radio frequency (RF) signal. In an example implementation, electrical path 150 may be a wired network path, wireless network path, and/or a combination of a wired and/or wireless network path. In another example implementation, electrical path 150 may be a wave guide, a coaxial cable, and/or another network path that is capable of transporting an electrical and/or RF signal. Electrical path 150 may enable an electrical signal to be transported from optical receiver 120 to DSP device 130.

Figure 2:
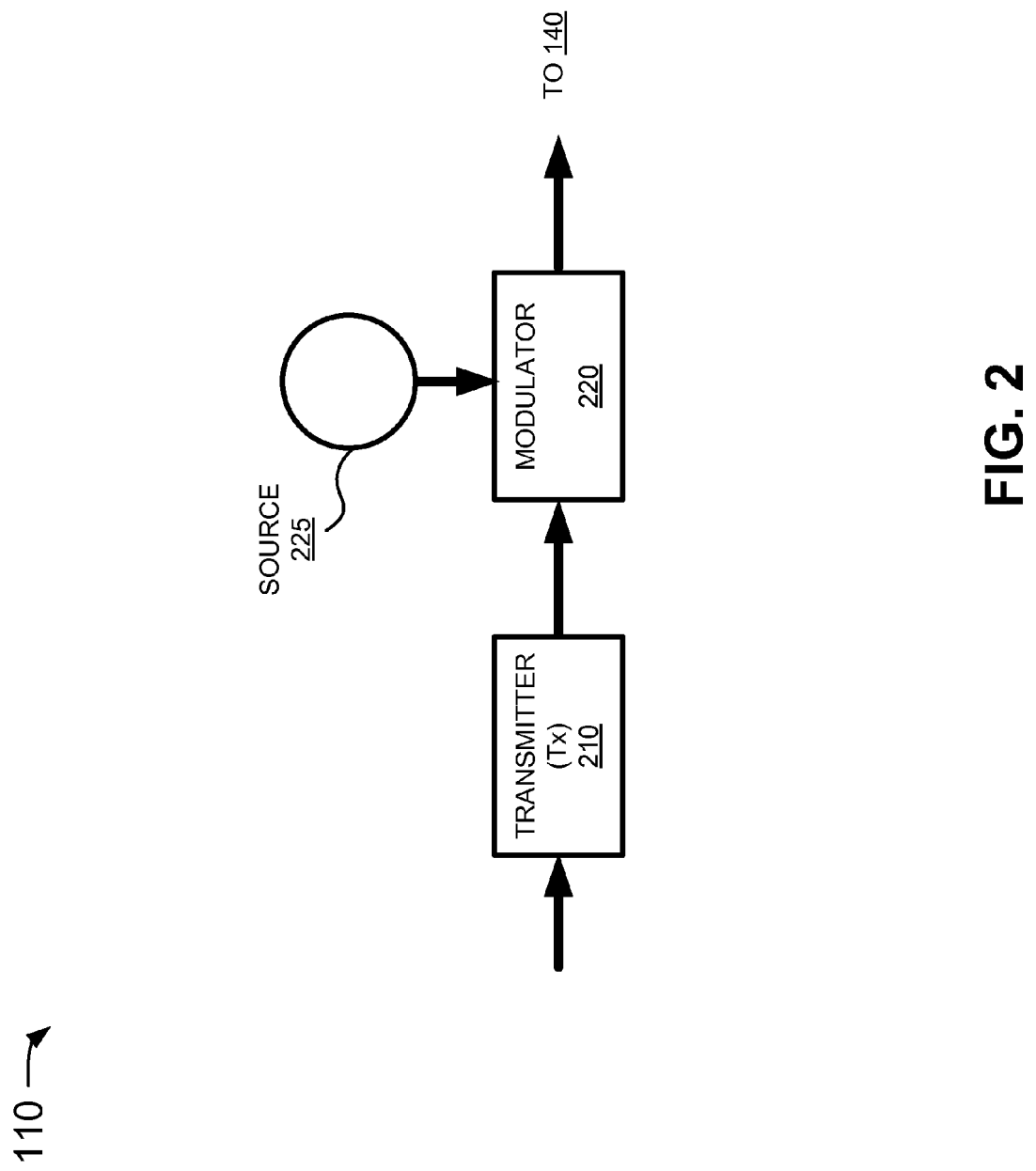
FIG. 2 is a diagram of example components of an optical transmitter device of FIG. 1.

FIG. 2 is a diagram of example components of optical transmitter 110. As illustrated in FIG. 2, optical transmitter 110 may include a collection of components, such as a transmitter (Tx) 210, a modulator 220, and/or a source 225. Although FIG. 2 shows example components of optical transmitter 110, in other implementations, optical transmitter 110 may contain fewer components, additional components, different components, or differently arranged components than depicted in FIG. 2. Furthermore, in some implementations, one or more of the components of optical transmitter 110 may perform one or more functions described as being performed by another one or more of the components of optical transmitter 110.

Transmitter 210 may include one or more components that are capable of generating an optical signal that can be outputted to an optical fiber, such as optical path 140. In one implementation, transmitter 210 may be a laser that generates and/or transmit an optical signal at a particular wavelength and/or with a particular bandwidth, which may be tuned and/or calibrated by a user of optical transmitter 110. Transmitter 210 may be tuned to enable the wavelength to be changed in a manner that permits the optical signal to be sent over one or more channels associated with optical path 140. Transmitter 210 may introduce a quantity of noise (e.g., phase noise and/or other types of noise) into the optical signal when generating and/or transmitting the optical signal.

Modulator 220 may include one or more components that are capable of modulating an optical signal received from transmitter 210. For example, modulator 220 may receive an optical signal from transmitter 210 and may modulate the optical signal using an electrical signal or radio frequency (RF) signal received from source 225. The electrical or RF signal may include a train of pulses, which modulator 220 may use to switch and/or modulate the optical signal to create a modulated signal. The modulated signal may include a train of pulses associated with a particular power level, bandwidth, duty cycle, period, etc. In one example, the modulated signal may be phase modulated. The phase modulated optical signal may, for example, be based on PSK-based modulation, such as differential PSK (DPSK), quadrature PSK (QPSK), binary (PSK), dual-polarization QPSK (DPQPSK), and/or higher-order PSK techniques. Modulator 220 may send the modulated optical signal to optical receiver 120 via optical path 140.

Source 225 may include one or more components that are capable of generating an electrical or radio frequency (RF) signal that is used, by modulator 220 to modulate the optical signal received from transmitter 210. Source 225 may transmit the electrical or RF signal to modulator 220.

Figure 3:
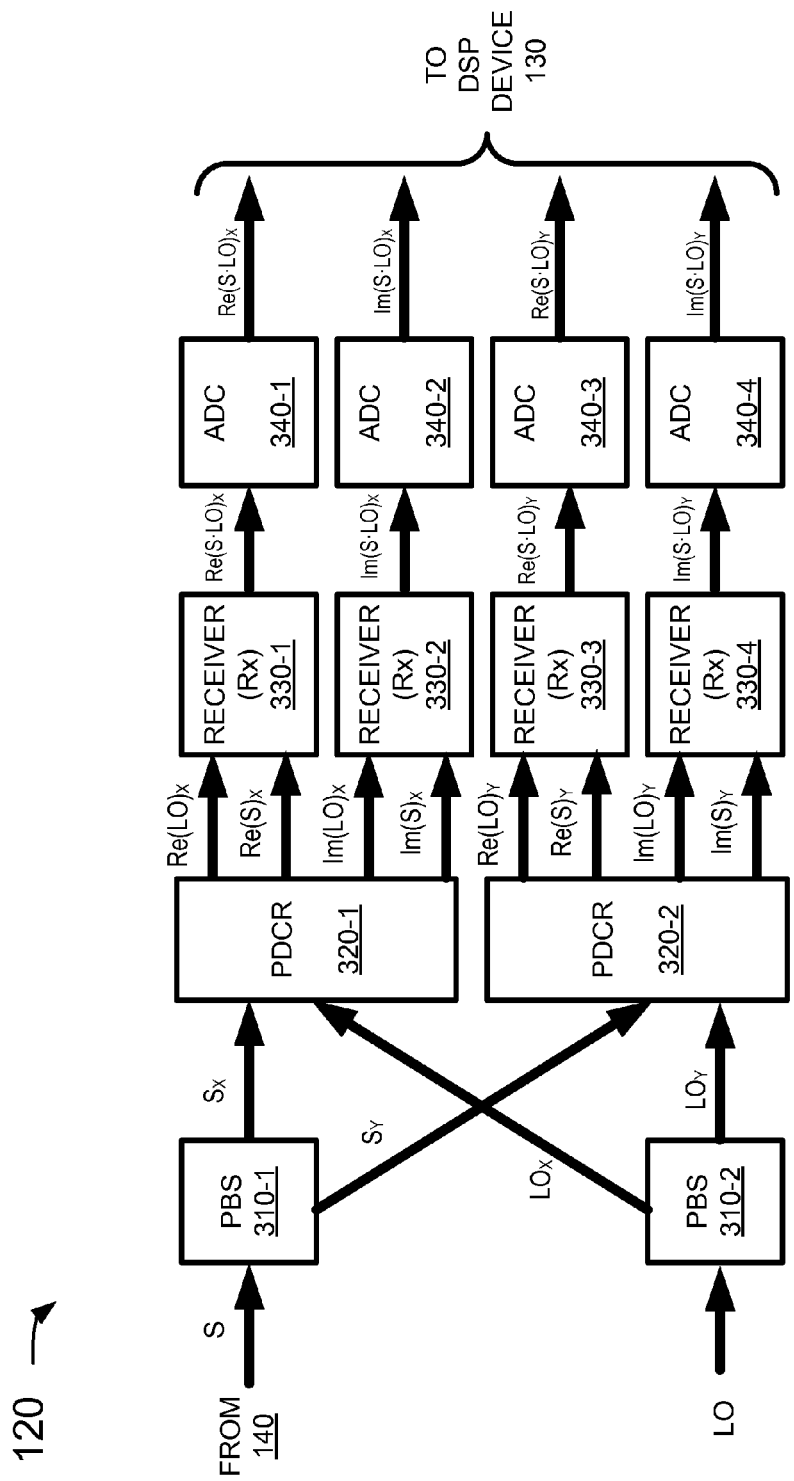
FIG. 3 is a diagram of example components of an optical receiver device of FIG. 1.

FIG. 3 is a diagram of example components of optical receiver 120. As illustrated in FIG. 3, optical receiver 120 may include a collection of components, such as a pair of polarization beam splitters (PBSs) 310-1 and 310-2 (hereinafter referred to collectively as "PBSs 310" and individually as "PBS 310"), a pair of polarization-diversity coherent receivers (PDCR) 320-1 and 320-2 (hereinafter referred to collectively as "PDCRs 320" and individually as "PDCR 320"), a group of receivers (Rx) 330-1, . . . , 330-4 (hereinafter referred to collectively as "receivers 330" and individually as "receiver 330"), and a group of analog-to-digital converters (ADC) 340-1, . . . , 340-4 (hereinafter collectively referred to as "ADCs 340" and individually as an "ADC 340").

Although FIG. 3 shows example components of optical receiver 120, in other implementations, optical receiver 120 may contain fewer components, additional components, different components, or differently arranged components than depicted in FIG. 3. Furthermore, in some implementations, one or more of the components of optical receiver 120 may perform one or more functions described as being performed by another one or more of the components of optical receiver 120.

PBS 310 may include one or more devices that receive an optical signal and/or convert the optical signal into different component signals each having a different polarization. For example, PBS 310-1 may receive an optical signal (e.g., shown as S in FIG. 3) from optical transmitter 110 via optical path 140. The optical signal may, for example, include constituent polarization components associated with two orthogonal axes (e.g., TE and TM)). PBS 310-1 may use the optical signal to generate a first optical signal (e.g., shown as $S_X$) associated with a first polarization, such as a TE polarization state, that is parallel to one of the axes (e.g., the X-axis). PBS 310-1 may also use the optical signal to generate a second optical signal (e.g., shown as $S_Y$ in FIG. 3) associated with a second polarization, such as a TM polarization state, that is parallel to another one of the axes (e.g., the Y-axis). PBS 310-1 may output, to PDCR 320-1, the first optical signal and/or the second optical signal.

In another example, PBS 310-2 may receive a reference optical signal (e.g., shown as LO in FIG. 3) from a local oscillator (LO). The local oscillator may, for example, be a laser that generates the reference optical signal that is associated with a first frequency and/or phase that is approximately equal to a second frequency (sometimes referred to herein as a "carrier frequency") and/or phase, associated with the optical signal (e.g., S), respectively. A degree to which the first phase differs from the second phase may be caused by phase noise introduced into the optical signal, by the optical transmitter 110 and/or optical path 140, and/or into the reference optical signal by the local oscillator.

PBS 310-2 may use the reference optical signal to generate a first reference signal (e.g., shown as $LO_X$) associated with the first polarization. PBS 310-2 may also use the reference optical signal to generate a second reference signal (e.g., shown as $LO_Y$ in FIG. 3) associated with the second polarization. PBS 310-2 may output, to PDCR 320-2, the first and/or the second reference signal. In another example, PBS 310-2 may be a splitter (e.g., that is a different type of splitter than the polarization beam splitter), that generates the first reference signal and/or the second reference signal.

PDCR 320 may include one or more devices that receive an optical signal associated with a single polarization component and process the optical signal to generate real and/or imaginary components associated with the optical signal. In an example implementation, PDCR 320 may be a 90 degree hybrid device that combines a reference signal with a received optical signal to generate real and/or imaginary components of the received optical signal and/or the reference signal.

PDCR 320-1 may, for example, receive the first optical signal (e.g., $S_X$) from PBS 310-1 and/or the first reference signal ($LO_X$) from PBS 310-2. PDCR 320-1 may mix the first reference signal with the first optical signal to generate real and imaginary components of the first reference signal and/or the first optical signal. For example, PDCR 320-1 may generate a real component of the first reference signal (e.g., $Re(LO)_X$) and/or the first optical signal (e.g., shown as $Re(S)_X$, where Re represents the real component). PDCR 320-1 may generate an imaginary component of the first reference signal (e.g., $Im(LO)_Y$) and/or the first optical signal (e.g., shown as $Im(S)_Y$, where Im represents the imaginary component).

PDCR 320-2 may receive the second optical signal (e.g., $S_Y$) from PBS 310-1 and/or the second reference signal ($LO_Y$) from PBS 310-2. PDCR 320-2 may mix the second reference signal with the second optical signal to generate real and imaginary components of the second reference signal and/or the second optical signal. For example, PDCR 320-2 may generate a real component of the second reference signal (e.g., $Re(LO)_Y$) and/or the second optical signal (e.g., shown as $Re(S)_Y$). PDCR 320-2 may generate an imaginary component of the second reference signal (e.g., $Im(LO)_Y$) and/or the second optical signal (e.g., shown as $Im(S)_Y$).

PDCRs 320 may output the real and/or imaginary components of the first and/or second optical signals, and/or the first and/or second reference signals, to receivers 330. The real and/or imaginary components of the first and/or second optical signals, combined with the first and/or second reference signals, may be transmitted to receivers 330 via one or more channels associated with optical receiver 120.

Receiver 330 may include one or more devices that receive an optical signal and convert the optical signal into an electrical signal. Receiver 330 may, in an example implementation, be a photo diode that receives, as input, the optical signal and generates, as output, an electrical signal based on the received optical signal.

Receiver 330-1 may, for example, receive a real component of the first optical signal (e.g., $Re(S)_X$) and/or first reference signal (e.g., $Re(LO)_X$) and may convert the real component, of the first optical signal and/or first reference signal, to a first electrical signal (e.g., shown as $Re(S \cdot LO)_X$). Receiver 330-1 may transmit the first electrical signal to ADC 340-1. Receiver 330-2 may, in another example, receive an imaginary component of the first optical signal (e.g., $Im(S)_X$) and/or the first reference signal (e.g., $Im(LO)_X$), and may convert the imaginary component, of the first optical signal and/or the first reference signal, to a second electrical signal (e.g., shown as $Im(S \cdot LO)_X$). Receiver 330-2 may transmit the second electrical signal to ADC 340-2.

Receiver 330-3 may, in another example, receive a real component of the second optical signal (e.g., $Re(S)_Y$) and/or the second reference signal (e.g., $Re(LO)_Y$) and may convert the real component, of the second optical signal and/or the second reference signal, to a third electrical signal (e.g., shown as $Re(S \cdot LO)_Y$). Receiver 330-3 may transmit the third electrical signal to ADC 340-3. Receiver 330-4 may, in yet another example, receive an imaginary component of the second optical signal (e.g., $Im(S)_Y$) and/or the second reference signal (e.g., $Im(LO)_Y$), and may convert the imaginary component, of the second optical signal and/or the second reference signal, to a fourth electrical signal (e.g., shown as $Im(S \cdot LO)_Y$). Receiver 330-4 may transmit the fourth electrical signal to ADC 340-4.

ADC 340 may include one or more devices that receive and/or process an electrical signal to convert the electrical signal to a digital electrical signal. ADC 340 may, in an example implementation, convert an electrical signal, received from receiver 330, to a digital electrical signal for transmission to DSP device 130 via electrical path 150. ADC 340 may, for example, sample an incoming electrical signal at a sampling rate that is greater than a threshold. The threshold may correspond to a Nyquist sampling rate that is greater than two times a bandwidth associated with the incoming electrical signal. ADC 340 may use the sampled signal to generate the digital electrical signal.

Figure 4:
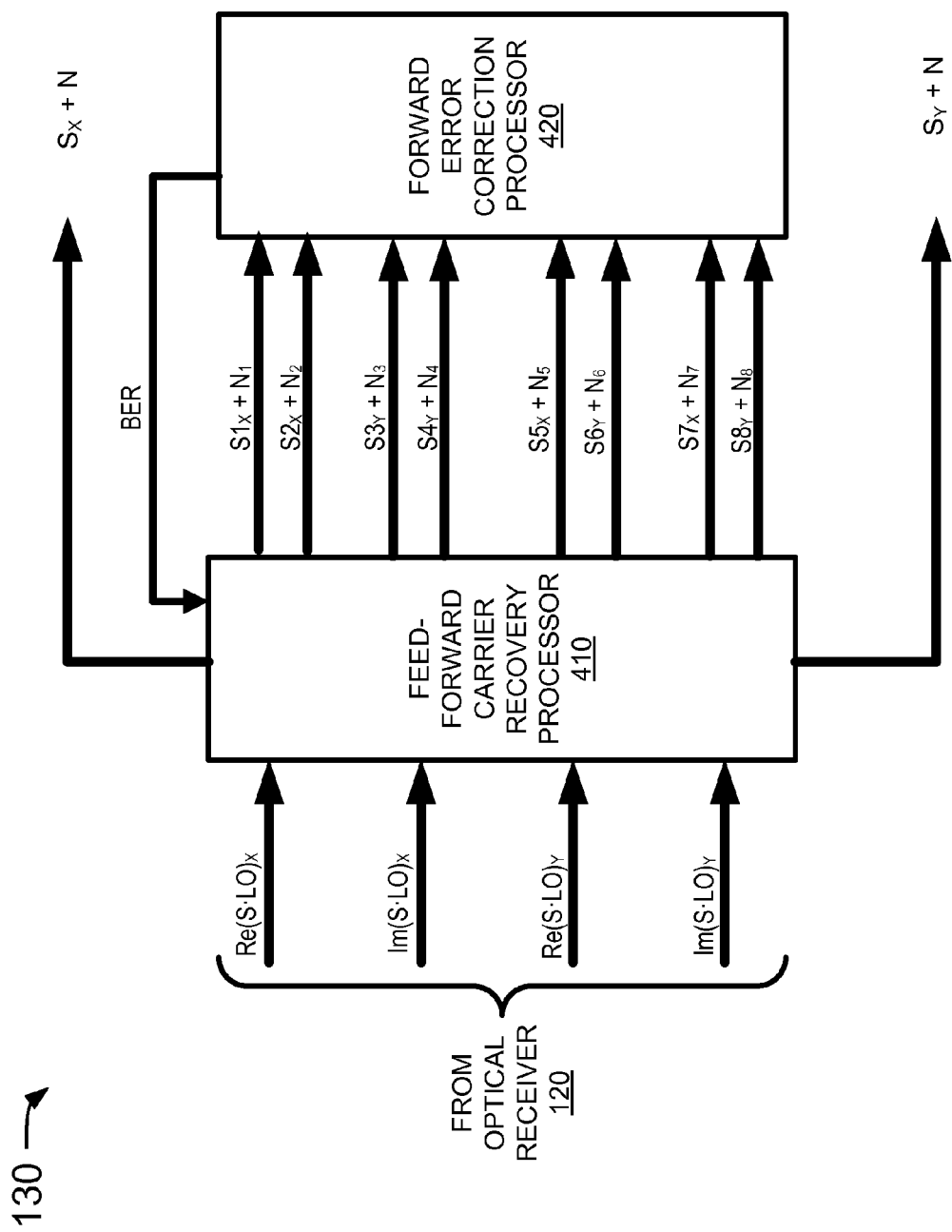
FIG. 4 is a diagram of example components of a digital signal processing device of FIG. 1.

FIG. 4 is a diagram of example components of a DSP device 130. As illustrated in FIG. 4, DSP device 130 may include a collection of components, such as a feedforward carrier recovery (FFCR) processor 410 and a forward error correction (FEC) processor 420. Although FIG. 4 shows example components of DSP device 130, in other implementations, DSP device 130 may contain fewer components, additional components, different components, or differently arranged components than depicted in FIG. 4. Furthermore, in some implementations, one or more of the components of DSP device 130 may perform one or more functions described as being performed by another one or more of the components of DSP device 130.

DSP device 130 may perform operations to correct or adjust bandwidth, associated with RF signals to conform to some bandwidth threshold. In another example, DSP device 130 may perform operations to correct or adjust quadrature angle error, associated with optical signals, to conform to some error threshold. In yet another example, DSP device 130 may identify and/or remedy conditions (e.g., associated with optical channel conditions, transmit conditions, etc.) such as limited optical bandwidth, polarization rotation, polarization mode dispersion, polarization dependent loss, or chromatic dispersion, etc.

FFCR processor 410 may include one or more components that that receive, process, and/or perform operations to identify a difference in phase between electrical signals and/or determine a quantity of phase noise associated with the electrical signals. In an example implementation, FFCR processor 410 may perform an FFCR operation to identify a quantity of phase noise associated with an electrical signal received from optical receiver 120. The identified quantity of phase noise may represent a first quantity of phase noise associated with a remote oscillator (e.g., such as a first laser associated with optical transmitter 110); a second quantity of phase noise caused by optical path 140 (e.g., from material defects and/or optical non-linearities in a fiber optic cable); a third quantity of phase noise associated with a local oscillator (e.g., such as a second laser associated with optical receiver 120); and/or another quantity of phase noise (e.g., from other components of optical transmitter 110, optical path 140 and/or optical receiver 130).

FFCR processor 410 may perform a carrier phase recovery operation to reduce a quantity of bit errors associated with a signal. FFCR processor 410 may, for example, process a first signal received from optical receiver 120. For example, FFCR processor 410 may combine the first electrical signal (e.g., $Re(S \cdot LO)_X$) and the second electrical signal (e.g., $Im(S \cdot LO)_X$) to create a first signal with a first polarization state (e.g., that is parallel to an X-axis). The first signal with the first polarization state may be analyzed to estimate a first optical phase (e.g., $\phi X$) on a symbol-by-symbol basis. The optical phase may include a quantity of phase noise. FFCR processor 410 may use a filter to process optical phase to obtain the first estimated carrier phase (e.g., $\theta X$) associated with the first signal. The processing may smooth the optical phase by reducing a rate at which the optical phase changes as a function of time and/or on a per-symbol basis. In another example, FFCR processor 410 may combine the third electrical signal (e.g., $Re(S \cdot LO)_Y$) and the fourth electrical signal (e.g., $Im(S \cdot LO)_Y$) to create a second signal with a second polarization state (e.g., that is parallel to a Y-axis). FFCR processor 410 may repeat the processing for the second signal (to estimate a second optical phase (e.g., $\phi Y$) and/or a second estimated carrier phase (e.g., $\theta Y$).

The estimated carrier phase may represent a phase difference between a phase associated with transmitted optical signal (e.g., from transmitter 210) and another phase associated with the LO oscillator. The filter may use one or more tap weights, to be described in greater detail with regard to FIG. 5A, to set up the filter in various configurations. The estimated carrier phase may then be removed from the first signal to generate a carrier recovered signal. FFCR processor 410 may, for example, use an adaptation application to set up the filter, in a first configuration, to generate a first carrier recovered signal (e.g., $S1_X$) that is transmitted to FEC processor 420. The first carrier recovery signal may be corrupted by a first quantity of noise (e.g., $N_1$), which may be detected as a first quantity of bit errors (e.g., bit error rate ($BER_1$)) by FEC processor 420. FEC processor 420 may correct the first quantity of bit errors provided the first quantity of bit errors does not exceed a correction capacity threshold of FEC processor 420.

The adaptation application may, in another example, set up the filter, in a second configuration, to generate a second carrier recovered signal (e.g., $S2_X$). The second carrier recovery signal may be corrupted by a second quantity of noise (e.g., $N_2$), which may be detected as a second quantity of bit errors (e.g., $BER_2$) by FEC processor 420.

The adaptation application may compare the first quantity of bit errors (e.g., $BER_1$) and the second quantity of bit errors (e.g., $BER_2$). If, for example, the first quantity of bit errors is less than the second quantity of bit errors (e.g., $BER_1<BER_2$), the adaptation application may cause FFCR processor 410 to process the first signal using the filter that is set up in the first configuration. If, however, the first quantity of bit errors is not less than the second quantity of bit errors (e.g., $BER_1 \geq BER_2$), then the adaptation application may cause FFCR processor 410 to process the first signal using the filter that is set up in the second configuration.

The FEC operations may be performed concurrently (e.g., within a period of time) and/or at non-concurrently (e.g., at different periods of time). When performing the FEC operations non-concurrently, FEC processor 420 may measure the first and second quantities of bit error at different points in time, corresponding to different filter shapes, chosen at the different points in time.

FFCR processor 410 may perform operations, in a manner similar to that described above, on a second signal that is associated with a second polarization state (e.g., that is parallel to a Y-axis, where the Y-axis is orthogonal to the X-axis). The adaptation application may, for example, set up the filter, in a third configuration, to generate a third carrier recovered signal (e.g., $S3_Y$). The third carrier recovery signal may be corrupted by a third quantity of noise (e.g., $N_3$), which may be detected as a third quantity of bit errors (e.g., $BER_3$) by the FEC processor 420.

FFCR processor 410 may repeat the process, described above, using the filter set up in a fourth configuration, to generate a fourth carrier recovered signal (e.g., $S4_Y$). The fourth carrier recovery signal may be corrupted by a fourth quantity of noise (e.g., $N_4$), which may be detected as a fourth quantity of bit errors (e.g., $BER_4$) by FEC processor 420. FFCR processor 410 may process the second signal using the filter, set up in the third configuration when the third quantity of bit errors is greater than the fourth quantity of bit errors (e.g., $BER_3 \geq BER_4$). FFCR processor 410 may process the second signal using the filter, set up in the fourth configuration when the third quantity of bit errors is not greater than the fourth quantity of bit errors (e.g., $BER_3<BER_4$).

The source of phase noise in optical systems may be correlated, between polarization states (e.g., associated with the first signal and/or the second signal). The correlation may occur due to the first and/or second signal originating from a same source laser (e.g., associated with optical transmitter 110), a same receive laser (e.g., associated with optical receiver 120), and/or under the influence of fiber nonlinearities (e.g., associated with optical path 140), which impair both polarization states. In this case FFCR processor 410 may process the first signal and/or the second signal, such that the optical phase, on a symbol-by-symbol basis, can be averaged between polarizations. The averaged optical phase may be filtered (e.g., smoothed as a function of time) in a manner similar to that described above.

The averaging may, for example, be performed using weighting parameter (e.g., A and B, where $A+B \cong 1$). The averaging may be a weighted average of a portion of the first optical phase (e.g., $\phi X$) and another portion of the second optical phase (e.g., $\phi Y$) to create a weighted average of the first and second optical phase. For example, the weighting parameter may be set to a first value (e.g., $A=\frac{1}{2}$, where $B=1-\frac{1}{2}=\frac{1}{2}$), that apportions one-half of the average optical phase to the first estimated carrier phase (e.g., $\theta X$) and one-half of the average optical phase to the second estimated carrier phase (e.g., $\theta Y$). In another example, the weighting parameter may be set to a second value (e.g., $A=0$) that may cause the first and second polarizations to operate independently by not apportioning any of the average carrier phase to the first or second estimated carrier phase.

In general, a quantity of phase applied to the first estimated carrier (e.g., $\theta X$) may be determined by applying the filter, in a manner similar to that described above, to the first weighted average of the optical phase. (e.g., $\phi 1 \cong A\phi Y+B\phi X$, where $\phi 1$ is the first weighted average of the optical phase). In another example, another quantity of phase applied to the second estimated carrier phase (e.g., $\theta Y$) may be determined by applying the smoothing filter to the second weighted average of the optical phase (e.g., $\phi 2 \cong A\phi X+B\phi Y$, where $\phi 2$ is the second weighted average of the optical phase). The first and second estimated carrier phase may be applied to the first and second signals (e.g., associated with the first and second polarizations) to generate the carrier recovered signals.

FFCR processor 410 may use an index (hereinafter referred to as an "XY averaging index") to specify the manner that the weighted averages are to be set. For example, a maximum XY averaging index may correspond to equal weighting (e.g., when A and B are approximately equal, such as when $A=0.5$ and $B=0.5$). In another example, a minimum XY averaging index may correspond to no averaging between the first and/or second signals (e.g., when $A \cong 0$ and $B \cong 1$), such as in the examples described above, where the first signal and/or the second signal are processed independently. In yet another example, an XY averaging index, between the minimum and maximum XY averaging indexes, may correspond to a portion of the first and third quantities of phase noise (e.g., where $A=0.3$, 0.25, etc.) being associated with the first signal and another portion of the first and third quantities of phase noise (e.g., where $B=0.7$, 0.75, etc.).

FFCR processor 410 may, in one example, use a first XY averaging index that causes the first weighting factor and/or the second weighting factor to be set to predetermined values (e.g., A1 and/or B1, respectively). FFCR processor 410 may generate fifth and/or sixth carrier recovered signals (e.g., $S5_X$ and/or $S6_Y$, respectively). The fifth and/or sixth carrier recovered signals may be corrupted by some combination of noise $N_5$ and $N_6$, which may be detected, as a fifth and/or sixth quantity of bit errors (e.g., $BER_5$ and/or $BER_G$, respectively), by the FEC processor 420.

FFCR processor 410 may, in another example, use a second XY averaging index that causes the first weighting factor and/or the second weighting factor to be set to other values (e.g., A2 and/or B2, respectively) that are different than the predetermined values. FFCR processor 410 may generate seventh and/or eighth carrier recovered signals (e.g., $S7_X$ and/or $S8_Y$, respectively). The seventh and/or eight carrier recovery signals may be corrupted by some other combination of noise (e.g., $N_7$ and $N_8$), which may be detected, as a seventh and/or eighth quantity of bit errors (e.g., $BER_7$ and $BER_8$, respectively), by the FEC processor 420.

Based on a determination that a sum of the fifth and sixth quantities of bit errors (e.g., $BER_5+BER_6$) is less than another sum of the seventh and eighth quantities of bit errors (e.g., $BER_7+BER_8$), FFCR processor 410 may select the first XY averaging index for continuing to generate the carrier recovered signals. Based on a determination that the sum of the fifth and sixth quantities of bit errors is not less than the sum of the seventh and eighth quantities of bit errors, FFCR processor 410 may select the second XY averaging index for continuing to generate the carrier recovered signals.

FEC processor 420 may include one or more components that receive and/or process signals to identify errors associated with the signals and/or to perform an error correction operation on the signals. FEC processor 420 may, in an example implementation, perform a forward error correction operation on signals, received from FFCR processor 410, to identify and/or correct bit errors associated with the signal. FEC processor 420 may, in another example, use an iterative forward error correction process to identify and/or correct bit errors associated with the signals. The iterative process may permit FEC processor 420 to identify and/or correct additional errors with each successive iteration. FEC processor 420 may perform the iterative process until a measure of the quantity of bit errors per bit (e.g., a bit error rate), is less than a threshold.

FEC processor 420 may, in another example, send a measure of the quantity of bit errors (e.g., shown as $BER_X$ and/or $BER_Y$ in FIG. 4), associated with the signals, to FFCR processor 410. The measure of the quantity of bit errors may, in one example, be sent to FFCR processor 410 via a control-based feedback loop and/or network path. Sending the measure of the quantity of bit errors, to FFCR processor 410, may enable FFCR processor 410 to perform a carrier phase recovery operation to reduce a quantity of phase noise associated with the signals.

The measure of the quantity of bit errors may, in one example, be obtained prior to performing the forward error correction operation on the signals (sometimes referred to as a pre-FEC bit error rate). In another example, the measure of the quantity of bit errors may be obtained during the forward error correction operation, such as after a first iteration, a second iteration, etc. Selecting different metrics for optimizing the carrier recovery may yield optimizations of the likelihood of having uncorrectable frames, which, depending on a type of FEC operation being performed, may not have a unique correlation with the pre-FEC error rate. Obtaining a pre-FEC error rate may enable the FFCR operation, performed by FFCR processor 410, to be performed within a first period of time. The first period of time may be less than a second period of time associated with performing the FFCR operation based on a measure of the quantity of bit errors obtained during one or more iterations associated with the forward error correction operation.

Figure 5A:
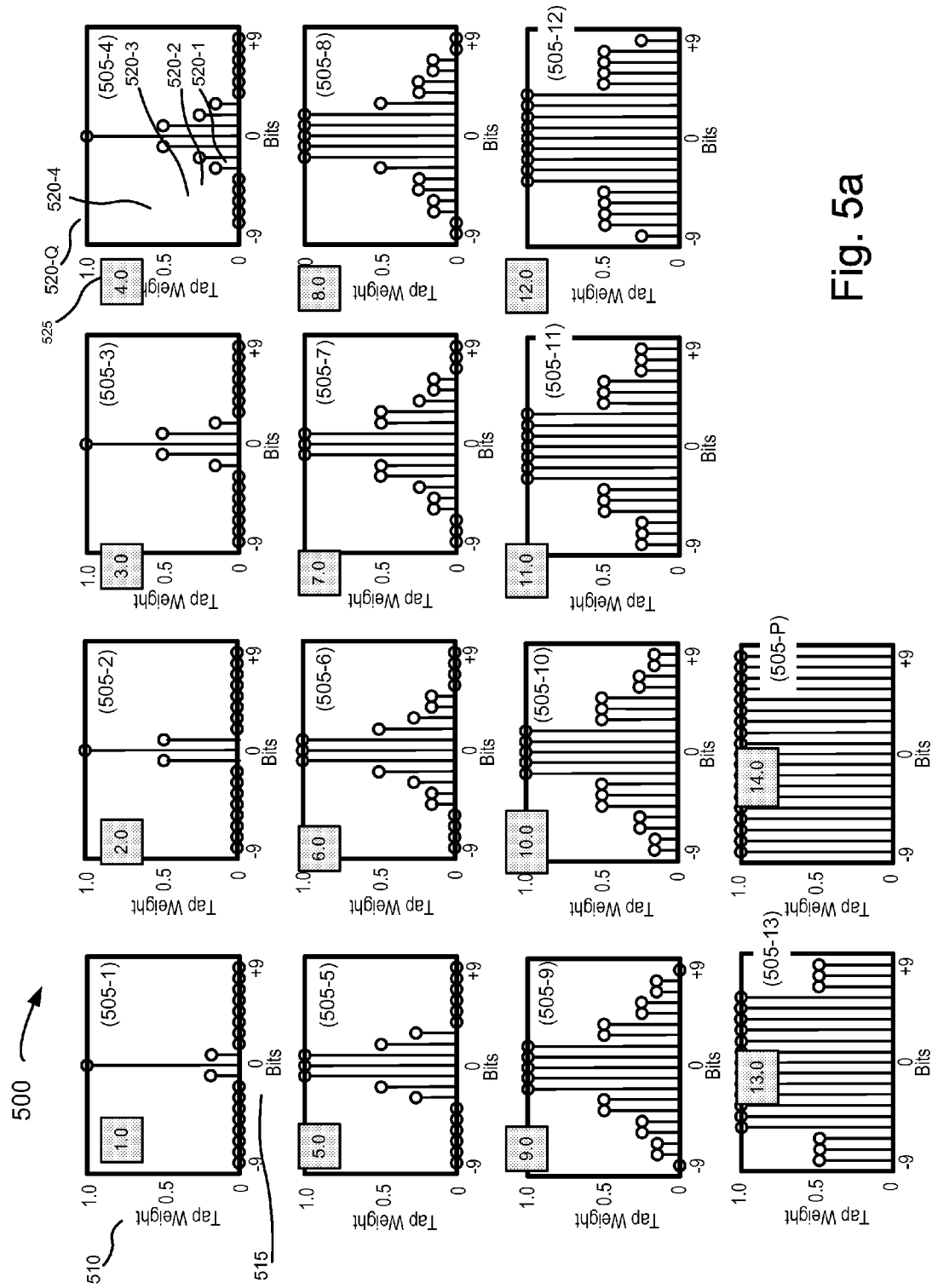
FIG. 5A is a diagram that illustrates example filter responses used by the digital signal processing device of FIG. 1.

FIG. 5A is a diagram that illustrates example filter response 500 used by DSP device 130. As illustrated in FIG. 5A, filter response 500 may include a group of tap weight configurations 505-1, . . . , 505-P (where P≥1) (hereinafter collectively referred to as "tap weight configurations 505" and individually as "tap weight configuration 505").

Tap weight configuration 505 may represent a configuration associated with a filter that is used by FFCR processor 410 to perform FFCR operations and/or carrier phase recovery operations. An adaptation application, hosted by FFCR processor 410, may use information associated with one or more tap weight configurations 505 to process a portion of signals received from optical receiver 120. The portions of the signals may correspond to a quantity of optical phase associated with the signals received from optical receiver 120. Each tap weight configuration 505 may include a tap weight axis 510, a bit axis 515, a collection of tap weights 520-1, . . . , 520-Q (where Q≥1) (hereinafter referred to collectively as "tap weights 520" and individually as "tap weight 520"), and tap weight index 525 (hereinafter referred to as "index 525").

Tap weight axis 510 may identify a range of tap weight values. The range of tap weight values may identify a range of values, such as from a minimum value (e.g., of 0 and/or some other minimum value) to a maximum value (e.g., of 1 and/or some other maximum value), to which tap weight 520 can be set by the adaptation application. Bit axis 515 may identify a range of bit positions that correspond to bits being sampled by a signal being processed via the filter. For example, negative bit positions (e.g., from −9 to −1) may correspond to bits arriving at a later point in time relative to positive bit positions (e.g., from 1 to 9). Bit axis 515 illustrates bit positions of −9 to +9 for explanatory purposes. In other implementations, bit axis 515 may include another range of bit positions that are different than the range of bit positions included in FIG. 5A.

Tap weight 520 may represent a manner in which a bit, associated with a signal, is to be sampled. A bit that is sampled by tap weight 520 may be based on a product of a value associated with the tap weight and an amplitude associated with the bit (e.g., a voltage level, a power level, a digital representation of voltage or power, etc.). For example, a first tap weight 520 of zero (e.g., tap weight 520-1) may indicate that a bit that corresponds to the first tap weight 520 may not be sampled by the filter. A bit that is not sampled, may not be included in a portion of the signal that is sampled by tap weights 520 that are greater than zero. In another example, a second tap weight 520 of one (e.g., tap weight 520-Q) may indicate that a bit that corresponds to the second tap weight 520 may be fully sampled by the filter (e.g., based on a product of the value associated with tap weight 520-Q×amplitude of the bit). In yet another example, other tap weights 520 (e.g., tap weights 520-2, . . . , 520-4) may be used to sample bits that may result in less than a fully sampled bit.

Index 525 may represent a value that corresponds to a filter configuration 505 based on a manner in which tap weights 520 are set. For example, for tap weight configuration 505-4, N index value 525 may correspond to a value (e.g., 4.0) associated with tap weight configuration 505-4. The adaptation application may use tap weight configurations 505, associated with index 525 that is less than a threshold (e.g., such as tap weight configurations 505-1 through 505-4), to sample signals associated with a high noise level (e.g., a quantity of phase noise that is greater than a threshold). In another example, the adaptation application may use other tap weight configurations 505, associated with index 525 that is not less than a threshold (e.g., such as tap weight configurations 505-11 through 505-P), to sample signals associated with a low noise level (e.g., a quantity of phase noise that is not greater than the threshold).

Figure 5B:
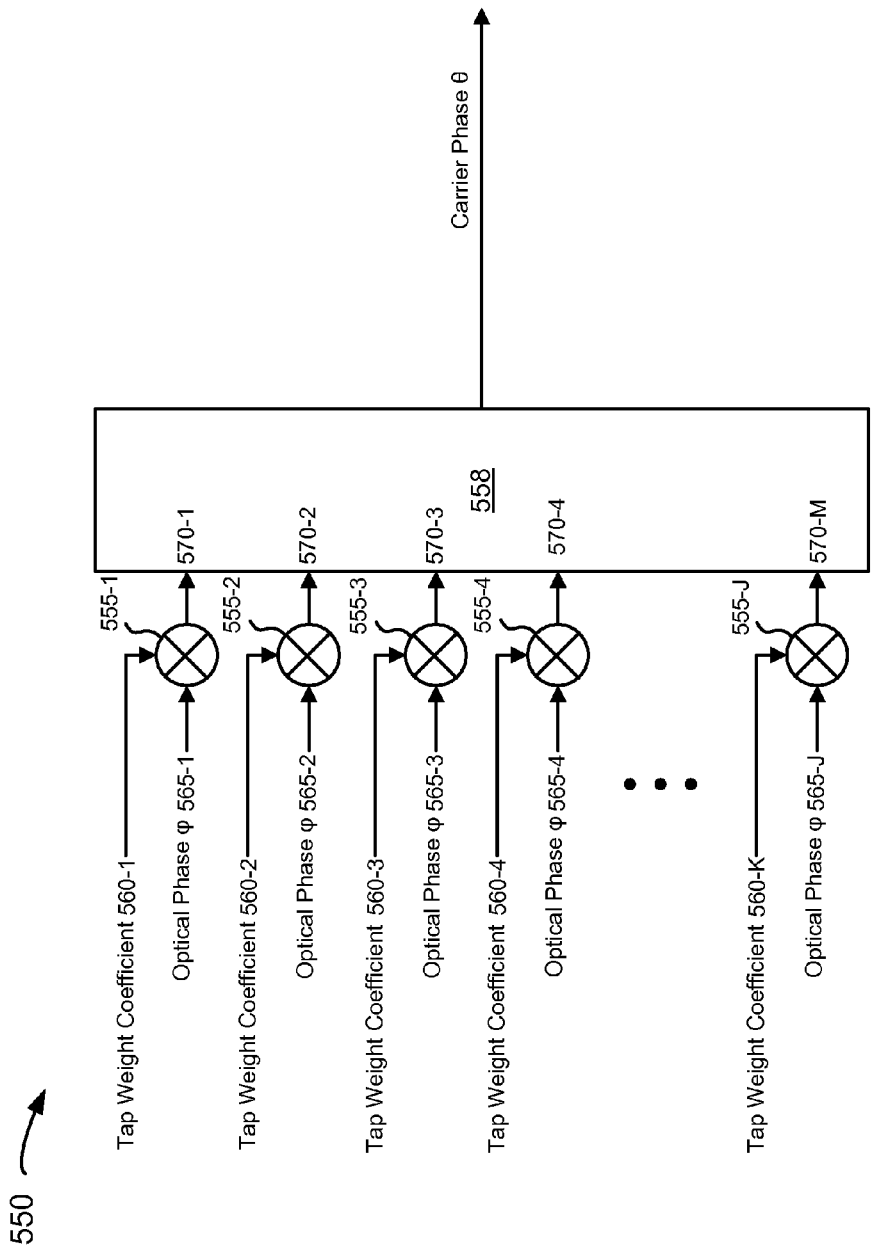
FIG. 5B is a diagram of example components of a filter, that is used by the digital signal processing device of FIG. 1, to generate one or more filter responses identified in FIG. 5A.

FIG. 5B is a diagram of example components of a filter 550, that is used by DSP 130, to generate one or more filter responses identified in FIG. 5A. For example, FFCR processor 410 may use filter 550 to filter signals, that correspond to an estimated quantity of optical phase (e.g., ϕ), included within a signal received from optical receiver 120 (e.g., $Re(S \cdot LO)_X+Im(S \cdot LO)_X$ and/or $Re(S \cdot LO)_Y+Im(S \cdot LO)_Y$). Filter 550 may output a signal that includes an estimated carrier phase (e.g., θ) associated with the signals received from optical receiver 120. In an example implementation, filter 550 may be a finite impulse response (FIR) filter. As shown in FIG. 5B, filter 550 may include a collection of components, such as a group of multipliers 555-1, . . . 555-J (where J≥1)

(hereinafter referred to collectively as "multipliers 555" and individually as "multiplier 555"), and a summing component 558. Although FIG. 5B shows example components of filter 550, in other implementations, filter 550 may contain fewer components, additional components, different components, or differently arranged components than depicted in FIG. 5B. Furthermore, in some implementations, one or more of the components of filter 550 may perform one or more functions described as being performed by another one or more of the components of filter 550.

Multiplier 555 may include one or more components that are capable of receiving, processing, and/or combining two or more signals. For example, multiplier 555 may receive two or more signals and may combine the two or more signals into a combined signal that is outputted to summing component 558. Multiplier 555 may combine the signals by multiplying one of the signals by another one of the signals to create the combined signal.

Multiplier 555-1 may, for example, receive a first signal (e.g., tap weight coefficient 560-1) that corresponds to a first tap weight 520 (e.g., 520-1) of FIG. 5B. Multiplier 555-1 may receive a second signal (e.g., optical phase $\phi$ 565-1) associated with an estimated quantity of carrier phase $\phi$ obtained, by FFCR processor 410, from the signal received from optical receiver 120. The second signal may correspond to a first bit associated with the second signal. Multiplier 555-1 may combine the first signal and the second signal by multiplying the first signal by the second signal to create a first combined signal 570-1. Multiplier 555-1 may output the first combined signal 570-1 to summing component 558.

In another example, multiplier 555-2 may receive another first signal (e.g., tap weight coefficient 560-2) that corresponds to a second tap weight 520 (e.g., 520-2) of FIG. 5B. Multiplier 555-2 may receive another second signal (e.g., optical phase $\phi$ 565-2) associated with the estimated quantity of carrier phase $\phi$. The second signal may correspond to a second bit associated with the second signal. Multiplier 555-2 may multiply the other first signal by the other second signal to create a second combined signal 570-2. Multiplier 555-2 may output the second combined signal 570-2 to summing component 558.

Filter 550 may include a multiplier 555 for each tap weight identified in FIG. 5A. Each of multipliers 555 may combine a respective first signal 560 and a respective second signal 565 to generate a respective combined signal 570 that is outputted summing component 558.

Summing component 558 may include one or more components that are capable of receiving signals and/or summing the received signals. For example, summing component 558 may receive two or more combined signals 570, from multipliers 555, and may output another signal based on the combined signals 570. The outputted signal may represent a sum of combined signals 570. More particularly, the outputted signal may represent a filtered signal that is based on a manner in which tap weights 520 (e.g., corresponding to tap weight coefficients 560) sampled a portion of bits associated with optical phase $\phi$ 565. The filtered signal, that is outputted by summing component 558, may represent an estimated carrier phase $\theta$ associated with the signal received from optical receiver 120.

Figure 6:
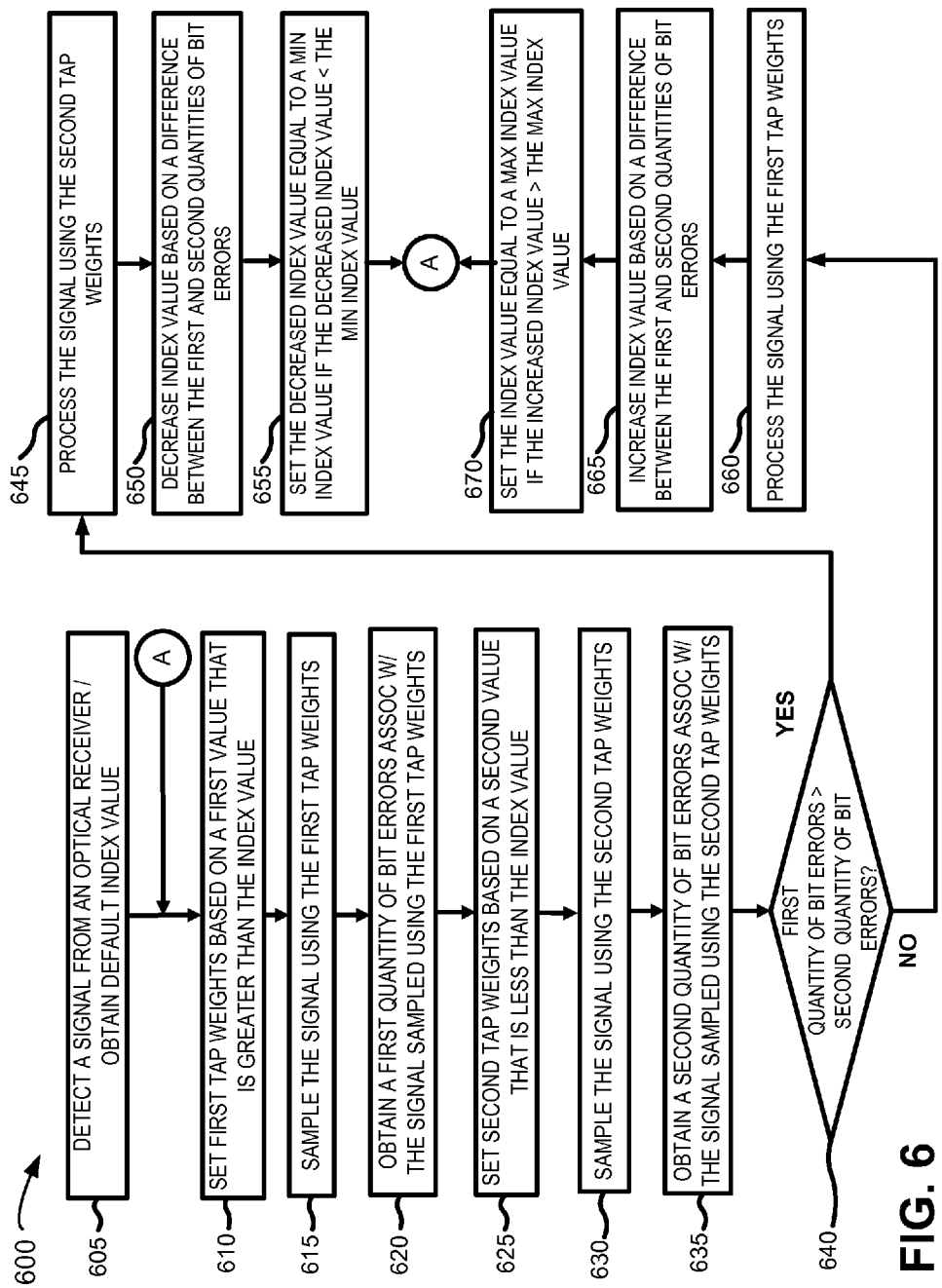
FIG. 6 is a flowchart of an example process for performing a carrier phase recovery operation according to an implementation described herein.

FIG. 6 is a flowchart of an example process for recovering carrier phase according to an implementation described herein. In one example implementation, process 600 may be performed by FFCR processor 410 and/or FEC processor 420. In another example implementation, some or all of process 600 may be performed by a device or collection of devices separate from, or in combination with, FFCR processor 410 and/or FEC processor 420.

As shown in FIG. 6, process 600 may include detecting a signal from an optical receiver and obtaining a default index value (block 605). For example, FFCR processor 410 may receive a signal from optical receiver 120 and may obtain, from a memory associated with FFCR processor 410, a default index value (e.g., default index 525) with which to recover the carrier phase. The signal may be associated with a first polarization state (e.g., that is parallel to an X-axis). In another example implementation, the signal may be associated with a second polarization state (e.g., that is parallel to an Y-axis, where the Y-axis may be orthogonal to the X-axis). In yet another example implementation, the signal may be associated with a third polarization state (e.g., a dual-polarization state that includes components associated with the X-axis and/or the Y-axis).

As also shown in FIG. 6, process 600 may include setting first tap weights based on a first value that is greater than the index value (block 610) and sampling the signal using the first tap weights (block 615). For example, FFCR processor 410 may identify a first value that is greater than the default index 525 by a predetermined quantity. The predetermined quantity may, in one example, be a constant that is greater than zero (e.g., 0.25, 0.5, 1.0, etc.). In another example, the predetermined quantity may be a portion (e.g., such as a percentage) of index 525 that is greater than zero (e.g., 10 percent, 20 percent, etc.).

FFCR processor 410 may set first tap weights 520, associated with tap weight configuration 505, to correspond to the first value. If, for example, the first value is approximately equal to six (e.g., based on a sum of a default index 525 of 5.5 and the predetermined quantity of 0.5), then FFCR processor 410 may set the first tap weights 520 to correspond to tap weight configuration 505-6 associated with index 525 of 6.0 (e.g., as shown in FIG. 5A). FFCR processor 410 may process the (e.g., by smoothing a rate of change associated with the optical phase as a function of time) signal, in a manner similar to that described above with respect to FIG. 4, using the filter that is configured based on the first tap weights 520 to obtain a first estimated carrier phase (e.g., $\phi X$ or $\phi Y$).

As further shown in FIG. 6, process 600 may include obtaining a first quantity of bit errors associated with the sampled signal using the first tap weights (block 620). For example, FFCR processor 410 may send, to FEC processor 420, a request to obtain a first quantity of bit errors (e.g., $BER_1$) associated with the first estimated carrier phase. The request may include the first estimated carrier phase that was processed based on the first tap weights. FEC processor 420 may receive the request and may perform an operation to identify a quantity of bit errors associated with first estimated carrier phase. FEC processor 420 may, in one example, identify the quantity of bit errors prior to performing a forward error correction operation on the first estimated carrier phase. FEC processor 420 may, in another example, identify the quantity of bit errors during a period of time when the forward error correction is being performed (e.g., after a first forward error correction iteration and/or another forward error correction iteration). FEC processor 420 may send the identified quantity of bit errors, to FFCR processor 410, as the first quantity of bit errors (e.g., $BER_1$). FFCR processor 410 may receive the first quantity of bit errors.

As yet further shown in FIG. 6, process 600 may include setting second tap weights based on a second value that is less than the index value (block 625) and sampling the signal using the second tap weights (block 630). For example, FFCR processor 410 may identify a second value that is less than the default index 525 by the predetermined quantity or another predetermined quantity that is different than the predetermined quantity.

FFCR processor 410 may set second tap weights 520, associated with tap weight configuration 505, to correspond to the second value. If, for example, the second value is approximately equal to five (e.g., based on a difference between the default index 525 of 5.5 and the predetermined quantity of 0.5), then FFCR processor 410 may set the second tap weights 520 to correspond to tap weight configuration 505-5 associated with index 525 of 5.0 (e.g., as shown in FIG. 5A). FFCR processor 410 may process the signal using the filter that is configured based on the second tap weights 520 to obtain a second estimated carrier phase.

As still further shown in FIG. 6, process 600 may include obtaining a second quantity of bit errors associated with the sampled signal using the second tap weights (block 635). For example, FFCR processor 410 may send, to FEC processor 420, a request to obtain a second quantity of bit errors (e.g., $BER_2$) associated with the second estimated carrier phase. The request may include the second portion of the signal that was sampled based on the second tap weights. FEC processor 420 may receive the request and may, in a manner similar to that described above (e.g., with respect to block 620), perform an operation to identify a quantity of bit errors associated with second estimated carrier phase. FEC processor 420 may send the identified quantity of bit errors, to FFCR processor 410, as the second quantity of bit errors (e.g., $BER_2$). FFCR processor 410 may receive the second quantity of bit errors.

As also shown in FIG. 6, if the first quantity of bit errors is greater than the second quantity of bit errors (block 640—YES), then process 600 may include processing the signal using the second tap weights (block 645). For example, FFCR processor 410 may compare the first quantity of bit errors to the second quantity of bit errors and may determine that the first quantity of bit errors is greater than the second quantity of bit errors. Based on the determination that the first quantity of bit errors is greater than the second quantity of bit errors, FFCR processor 410 may process the signal using the filter that is set up based on the second tap weights 520.

As further shown in FIG. 6, process 600 may include decreasing the index value based on a difference between the first and second quantities of bit errors (block 650) and setting the index value equal to a minimum index value if the decreased index value is less than the minimum index value (block 655). For example, FFCR processor 410 may identify a first difference between the first quantity of bit errors (e.g., $BER_1$) and the second quantity of bit errors (e.g., $BER_2$). FFCR processor 410 may decrease index 525 based on a product of a predetermined constant (e.g., $G_N$) multiplied by the first difference between first quantity and the second quantity of bit errors (e.g., where decrease index 525=index 525−$G_N$*($BER_1$−$BER_2$)).

FFCR processor 410 may determine whether the decreased index 525 is less than a minimum index 525. FFCR processor 410 may set the decreased index 525 to the minimum index 525 based on a determination that the decreased index 525 is less than the minimum index 525. FFCR processor 410 may continue to perform the operation on the signal to recover the estimated carrier phase, in a manner similar to that described above with respect to blocks 610-640, based on the decreased index 525. In another example implementation, FFCR processor 410 may process another signal, associated with a second polarization state (e.g., that is parallel to the Y-axis, which may be orthogonal to the X-axis), in a manner similar to that described above with respect to blocks 605-670).

As yet further shown in FIG. 6, if the first quantity of bit errors is not greater than the second quantity of bit errors (block 640—NO), then process 600 may include processing the signal using the first tap weights (block 660). For example, FFCR processor 410 may determine that the first quantity of bit errors is not greater than the second quantity of bit errors based on the comparison between the first quantity of bit errors and the second quantity of bit errors. Based on the determination that the first quantity of bit errors is not greater than the second quantity of bit errors, FFCR processor 410 may process the signal using the filter that is set up based on the first tap weights 520.

As still further shown in FIG. 6, process 600 may include increasing the index value based on a difference between the first and second quantities of bit errors (block 665) and setting the index value equal to a maximum index value if the increased index value is greater than the maximum index value (block 670). For example, FFCR processor 410 may identify a second difference between the first quantity of bit errors (e.g., $BER_1$) and the second quantity of bit errors (e.g., $BER_2$). FFCR processor 410 may increase index 525 based on a product of the predetermined constant (e.g., $G_N$) multiplied by the second difference between first quantity and the second quantity of bit errors (e.g., where increased index 525=index 525+$G_N$*($BER_2$−$BER_1$)).

FFCR processor 410 may determine whether the increased index 525 is greater than a maximum index 525. FFCR processor 410 may set the increased index 525 equal to the maximum index 525 based on a determination that the increased index 525 is greater than the maximum index 525. FFCR processor 410 may continue to perform the operation on the signal to recover the estimated carrier phase, in a manner similar to that described above in blocks 610-640, based on the increased index 525. Additionally, or alternatively, FFCR processor 410 may process another signal, associated with a second polarization state (e.g., that is parallel to the Y-axis, which may be orthogonal to the X-axis) in a manner similar to that described above in blocks 605-670).

Figure 7:
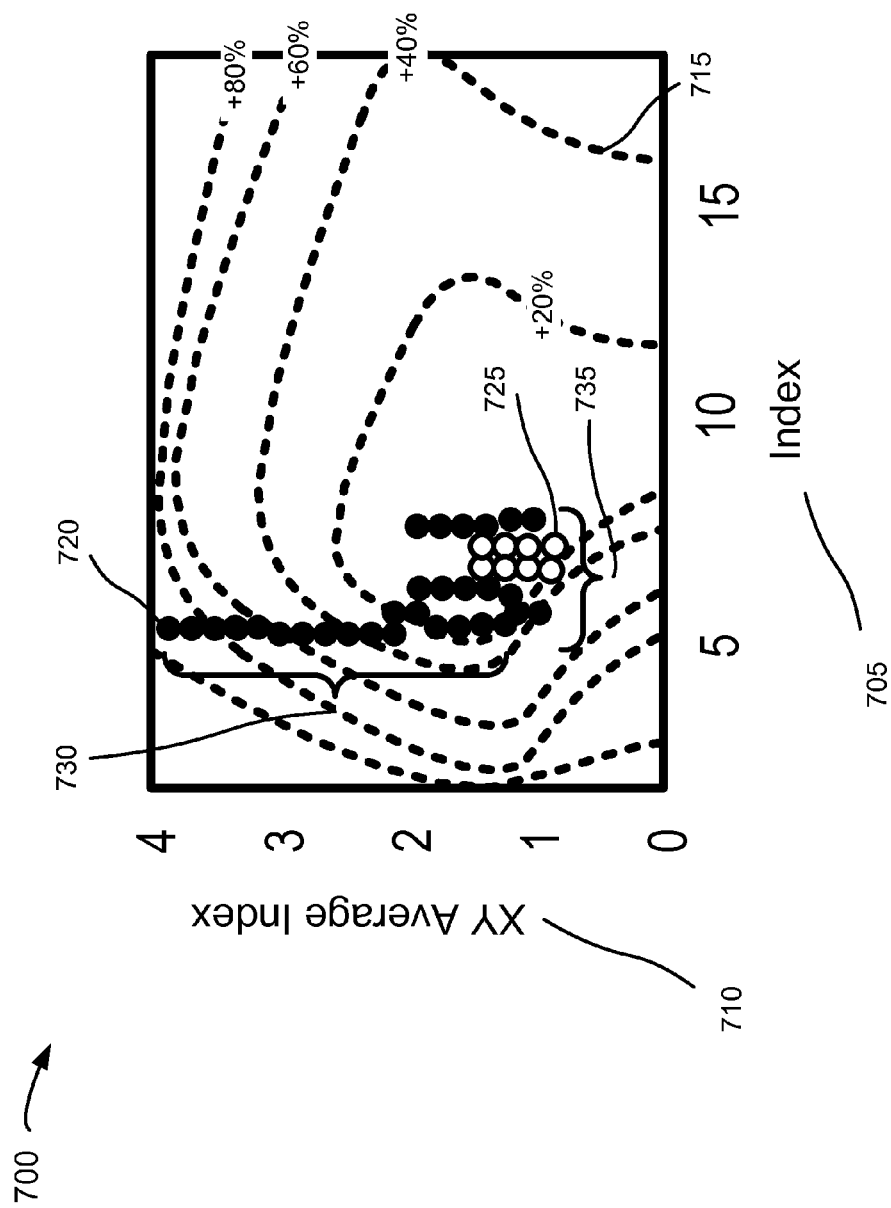
FIG. 7 is a diagram that illustrates example contour plots associated with a carrier phase recovery operation, according to an implementation described herein.

FIG. 7 is a diagram of an example contour plot 700 that illustrates a level of performance of a carrier phase recovery operation on a signal according to an implementation described herein. As shown in FIG. 7, contour plot 700 may illustrate a manner in which a quantity of bit errors, associated with a signal, are reduced as a result of performing a carrier phase recovery operation on the signal in a manner similar to that described in FIG. 6. Additionally, contour plot 700 may illustrate a manner in which a carrier phase recovery operation, associated with polarization averaging, which will be described in greater detail with respect to FIG. 8, can reduce the quantity of bit errors associated with the signal. Contour plot 700 may include an index-axis data item 705 (hereinafter referred to as "index-axis 705"), an XY average index-axis data item 710 (hereinafter referred to as "XY average-axis 710"), a bit error rate (BER) data item 715, a non-optimum Q-point data item 720 (hereinafter referred to as non-optimum Q-point 720), and an optimum Q-point data item 725 (hereinafter referred to as "optimum Q-point 725"). FIG. 7 illustrates a number of data items for explanatory purposes. In another example implementation, contour plot 700 may include additional data items, fewer data items, different data items, and/or differently arranged data items than are shown in FIG. 7.

Index-axis 705 may identify a range of values, associated with index 525, that correspond to a filter used by FFCR processor 410 when performing a carrier phase recovery operation. XY average-axis 710 may identify another range of values associated with an XY averaging index that identifies a manner in optical phase associated with constituent polarization components of a signal are to be averaged. Bit error rate (BER) data item 715 may represent a line of constant bit rate error relative to a range of values that correspond to index 525 identified by index-axis 705 and/or another range of values that correspond to an XY averaging index identified by XY average-axis 710. For example, a first BER data item 715 (e.g., labeled as +80%) may correspond to a quantity of bit errors that is 80% greater than a minimum threshold. In another example, another BER data items 715 (e.g., labeled as +20%) may correspond to another quantity of bit errors that is 20% greater than the minimum threshold.

Non-optimum Q-point data item 720 may identify a point (e.g., shown as a solid black circle), associated with contour plot 700, that corresponds to N-index 525 (e.g., identified by index-axis 705) and/or an XY averaging index (e.g., identified by XY average-axis 710). Non-optimum Q-point 720 may represent a first index-axis 525 and/or a corresponding first XY averaging index value that were used, by FFCR processor 410, to process a signal associated with a first quantity of bit errors that are greater than a threshold. Non-optimum Q-point 720 may, generally, represent an early period, of the carrier recovery optimization operation, before a quantity of bit errors, associated with the signal, have been reduced to the minimum threshold.

Optimum Q-point data item 725 may identify another point (e.g., shown as a white circle), associated with contour plot 700, that corresponds to N-index 525 (e.g., identified by index-axis 705) and/or an XY averaging index (e.g., identified by XY average-axis 710). Optimum Q-point 725 may represent a second index-axis 525 value and/or a corresponding second XY averaging index value that were used, by FFCR processor 410, to process a signal associated with a second quantity of bit errors that correspond to the minimum threshold. Optimum Q-point 725 may, generally, represent a later period, of the carrier phase recovery operation, when a quantity of bit errors, associated with the signal, have been reduced to the minimum threshold.

For example, as shown in contour plot 700, the phase noise operation may have been initially performed, on a signal, using a first index 525 of approximately four and/or a first XY average index of approximately four (e.g., as shown by non-optimum Q-point 720). A position, associated with non-optimum Q-point 720, may correspond to a quantity of bit errors that are 80% higher than the minimum threshold (e.g., based on +80% BER data item 715). As shown in contour plot 700, the carrier phase recovery operation may cause XY averaging index to decrease as shown by a change in position, of non-optimum Q-point 720, downward from a XY averaging index of four to another XY averaging index of approximately 1.0 to 1.5 (e.g., as shown by bracket 730). The reduction in the XY averaging index may correspond to a reduction in a quantity of weighted averaging between a first component (e.g., corresponding to an X-polarization) and/or a second component (e.g., corresponding to a Y-polarization) of the signal. The reduction in the quantity of averaging may correspond to a reduction in the quantity of bit errors, associated with the signal, based another position of non-optimal Q-point 720 that corresponds to one or more locations between +20% and +40% BER data items 715.

As also shown in contour plot 700, the carrier phase recovery operation may cause index 525 to increase, as shown by a change in position of non-optimum Q-point 720 in a rightward direction, from approximately four to approximately six (e.g., as shown by bracket 735). The increase in index 525 may also cause non-optimum Q-point 720 to change to optimum Q-point 725. The increase in index 525 may correspond to a reduction in the quantity of bit errors, associated with the signal, based on a position, associated with optimal Q-point 725, that is within 20% BER data item 715.

Figure 8:
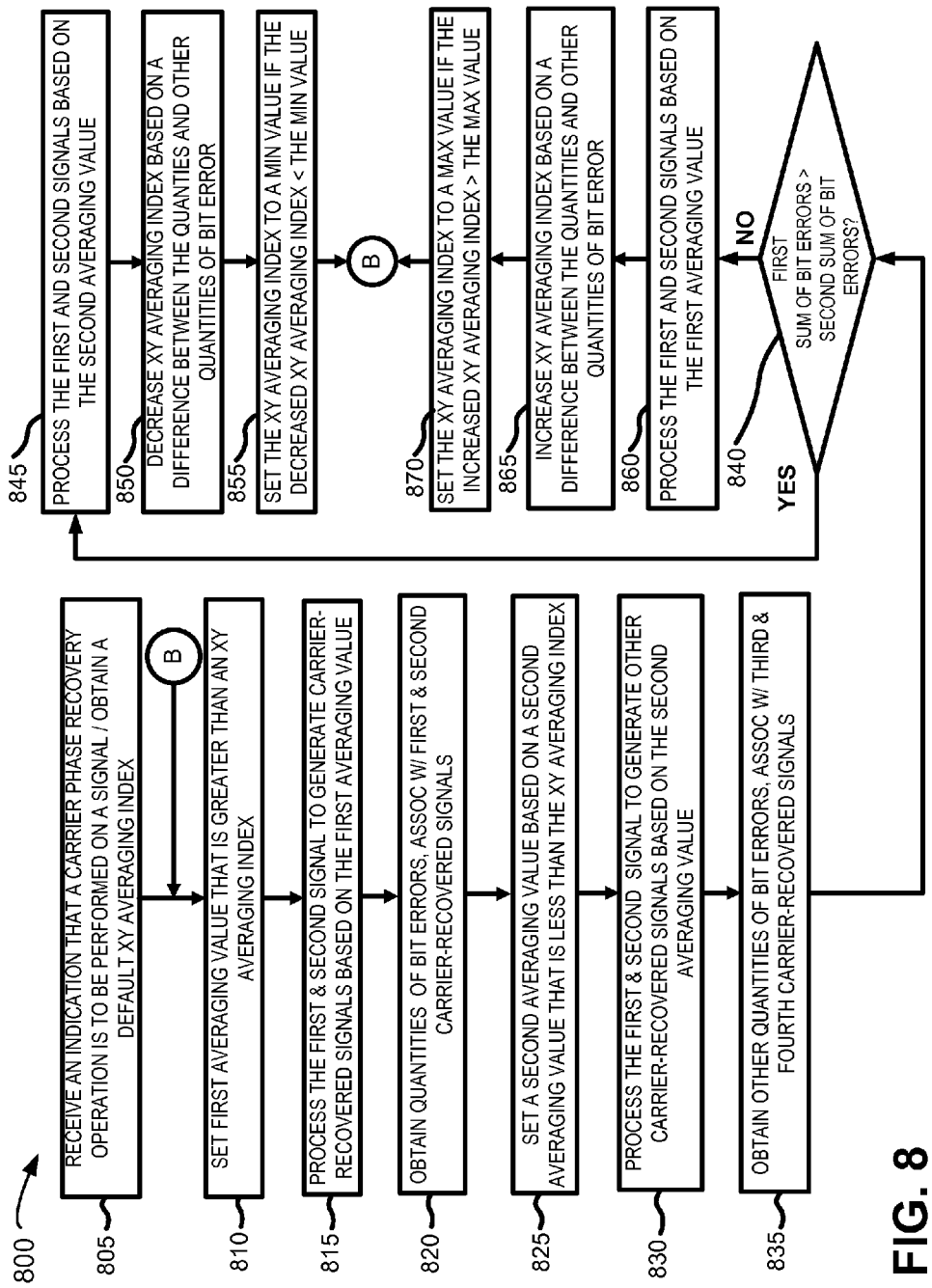
FIG. 8 is a flowchart of an example process for performing another carrier phase recovery operation according to an implementation described herein.

FIG. 8 is a flowchart of an example process 800 for performing a carrier phase recovery operation according to an implementation described herein. In one example implementation, process 800 may be performed by FFCR processor 410 and/or FEC processor 420. In another example implementation, some or all of process 800 may be performed by a device or collection of devices separate from, or in combination with, FFCR processor 410 and/or FEC processor 420.

Assume, in the description below, that FFCR processor 410 has performed a carrier phase recovery operation, on components of a signal, in a manner similar to that described above with respect to blocks 605-670 in FIG. 6. The components of the signal may correspond to a first signal, associated with an X-polarization, and a second signal associated with a Y-polarization (e.g., where the Y-polarization is orthogonal to the X-polarization). Assume further that FFCR processor 410 has generated a respective value, associated with index 525, for each signal as a result of the operation.

As shown in FIG. 8, process 800 may include receiving an indication that a carrier phase recovery operation is to be performed on a signal (block 805). For example, FFCR processor 410 may receive an indication that a first index 525 has been identified for the first signal associated with an X-polarization and/or that a second index 525 has been identified for the second signal, associated with a Y-polarization. Based on the determination that the first and/or second indexes 525 have been identified, FFCR processor 410 may obtain and a default XY averaging index that has been predetermined by FFCR processor 410 and/or an operator associated with FFCR processor 410.

As also shown in FIG. 8, process 800 may include setting a first averaging value that is greater than the XY averaging index (block 810) and processing the first signal and/or second signal, to generate carrier recovered signals, based on the first averaging value (block 815). For example, FFCR processor 410 may identify a first averaging value that is greater than the default XY averaging index by a predetermined quantity. The predetermined quantity may, in one example, be a constant that is greater than zero (e.g., 0.25, 0.5, 1.0, etc.). In another example, the predetermined quantity may be a portion (e.g., such as a percentage) of the XY averaging index that is greater than zero (e.g., 10 percent, 20 percent, etc.).

FFCR processor 410 may, in a manner similar to that described above with respect to FIG. 4, use the first averaging value to set a first weighting parameter (e.g., A) and/or a second weighting parameter (e.g., B). FFCR processor 410 may generate first and/or second carrier-recovered signals that correspond to an X-polarization and/or an Y-polarization, respectively. The first and/or second carrier-recovered signals may be corrupted by some quantity of noise (e.g., $N_1$ and/or $N_2$, respectively).

As further shown in FIG. 8, process 800 may include obtaining quantities of bit errors, associated with first and second carrier-recovered signals (block 820). For example, FFCR processor 410 may send, to FEC processor 420, the first and/or second carrier recovered signals to obtain a first quantity of bit errors (e.g., $BER_1$) associated with the first carrier-recovered signal and a second quantity of bit errors (e.g., $BER_2$) associated with the second carrier-recovered signal.

FEC processor 420 may receive the first and second carrier-recovered signals and may perform an operation to identify the first and second quantities of bit errors. FEC processor 420 may, in one example, identify the quantities of bit errors prior to performing a forward error correction operation on the first and/or second carrier-recovered signals. FEC processor 420 may, in another example, identify the quantities of bit errors during a period of time when the forward error correction is being performed (e.g., after a first forward error correction iteration and/or another forward error correction iteration). FEC processor 420 may send the identified quantities of bit errors (e.g., $BER_1$ and/or $BER_2$), to FFCR processor 410. FFCR processor 410 may receive the first and second quantities of bit errors.

As yet further shown in FIG. 8, process 800 may include setting a second averaging value that is less than the XY averaging index (block 825) and processing the first and second signals to other carrier-recovered signals based on the second averaging value (block 830). For example, FFCR processor 410 may identify a second value that is less than the default XY averaging index by the predetermined quantity and/or another predetermined quantity.

FFCR processor 410 may, in a manner similar to that described above with respect to FIG. 4, use the second averaging value to set the weighting parameter (e.g., A) and/or the second weighting parameter (e.g., B). FFCR processor 410 may generate third and/or fourth carrier-recovered signals that correspond to the X-polarization and/or an Y-polarization, respectively. The third and/or fourth carrier-recovered signals may be corrupted by some quantity of noise (e.g., $N_3$ and/or $N_4$, respectively).

As still further shown in FIG. 8, process 800 may include obtaining a other quantities of bit errors, associated with third and fourth carrier-recovered signals (block 835). For example, FFCR processor 410 may send, to FEC processor 420, the third and/or fourth carrier-recovered signals to obtain a third quantity of bit errors (e.g., $BER_3$) associated with the third carrier-recovered signal and/or a fourth quantity of bit errors (e.g., $BER_4$) associated with the fourth carrier-recovered signal.

FEC processor 420 may receive the third and/or fourth carrier-recovered signals and may, in manner similar to that described above with respect to block 820, perform an operation to identify the third and/or fourth quantities of bit errors. FEC processor 420 may send the identified quantity of bit errors (e.g., $BER_3$ and/or $BER_4$), to FFCR processor 410 and FFCR processor 410 may receive the identified quantity of bit errors.

As also shown in FIG. 8, if the quantities of bit errors is greater than the other quantities of bit errors (block 840—YES), then process 800 may include processing the first and second signals based on the second averaging value (block 845). For example, FFCR processor 410 may compare a first sum of the first and second quantities of bit error (e.g., $BER_1+BER_2$) to a second sum of the third and fourth quantities of bit error (e.g., $BER_3+BER_4$) and may determine that the first sum is greater than the second sum. Based on the determination that the first sum is greater than the second sum, FFCR processor 410 may process the first and second signals based on the second averaging value.

As further shown in FIG. 8, process 800 may include decreasing the XY averaging index based on a difference between the quantities and other quantities of bit error (block 850) and setting the XY averaging index value equal to a minimum value if the decreased XY averaging index is less than the minimum value (block 855). For example, FFCR processor 410 may identify a first difference between the first sum of the first and second quantities of bit error (e.g., $BER_1+BER_2$, respectively) and the second sum of the third and fourth quantities of bit error (e.g., $BER_3+BER_4$). FFCR processor 410 may decrease the XY averaging index based on a product of a predetermined constant (e.g., $G_A$) multiplied by the first difference between the first sum and the second sum (e.g., where decreased XY averaging index≅XY averaging index$-G_A*((BER_1+BER_2)-(BER_3+BER_4)))$.

FFCR processor 410 may determine whether the decreased XY averaging index is less than a minimum value. FFCR processor 410 may set the decreased XY averaging index to the minimum value based on a determination that the decreased XY averaging index is less than the minimum value. FFCR processor 410 may continue to perform the carrier phase recovery operation on the first and/or second signal, in a manner similar to that described above with respect to FIG. 6 and/or with respect to blocks 810-840 based on the decreased XY averaging index.

As yet further shown in FIG. 8, if the quantities of bit error are not greater than the other quantities of bit error (block 840—NO), then process 800 may include processing the first and second signals based on the first averaging value (block 860). For example, FFCR processor 410 may determine that the first sum, of the first and second quantities of bit error, is not greater than the second sum of the third and fourth quantities of bit error. Based on the determination that the first sum is not greater than the second sum, FFCR processor 410 may process the first and second signals based on the first averaging value.

As further shown in FIG. 8, process 800 may include increasing the XY averaging index based on a difference between the quantities and other quantities of bit error (block 865) and setting the XY averaging index value equal to a maximum value if the increased XY averaging index is greater than the maximum value (block 870). For example, FFCR processor 410 may identify a difference between the first sum of the first and second quantities of bit error (e.g., $BER_1+BER_2$, respectively) and the second sum of the third and fourth quantities of bit error (e.g., $BER_3+BER_4$). FFCR processor 410 may increase the XY averaging index based on a product of the predetermined constant (e.g., $G_A$) multiplied by the difference between first sum and the second sum (e.g., where increased XY averaging index≅XY averaging index$+G_A*((BER_3+BER_4)-(BER_2+BER_1)))$.

FFCR processor 410 may determine whether the increased XY averaging index is greater than a maximum value. FFCR processor 410 may set the increased XY averaging index to the maximum value based on a determination that the increased XY averaging index is greater than the maximum value. FFCR processor 410 may continue to perform the carrier phase recovery operation on the first and/or second signal, in a manner similar to that described above with respect to FIG. 6 and/or with respect to blocks 810-840 based on the increased XY averaging index.

Systems and/or methods, described herein, may include a technique for recovering carrier phase, associated with a signal received from an optical coherent receiver, based on a quantity of errors associated with the signal. As described herein, a feedforward carrier recovery (FFCR) device may dynamically tune a filter while processing the signal.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 8, the order of the blocks may be changed in other implementations. Also, non-dependent blocks may be performed in parallel.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

No element, act, or instruction used in the present application should be construed as critical or essential to the implementation unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:
    receiving, from an optical receiver, a signal derived from a first optical signal and a second optical signal generated by a local oscillator;
    filtering the signal by using a filter, set to a first configuration, to obtain a first recovered signal;
    performing forward error correction, on the first recovered signal, to obtain a first quantity of bit errors that corresponds to the first recovered signal;
    filtering the signal by using the filter, set to a second configuration, to obtain a second recovered signal;
    performing the forward error correction, on the second recovered signal, to obtain a second quantity of bit errors that corresponds to the second recovered signal;
    determining that the first quantity of bit errors is less than the second quantity of bit errors; and
    processing the signal by using the first configuration based on determining that the first quantity of bit errors is less than the second quantity of bit errors.

2. The method of claim 1,
    where the filter corresponds to a feedforward carrier recovery component associated with the device,
        where performing the forward error correction on the first recovered signal includes:
            determining a difference between the first recovered signal and the first optical signal, to obtain the first quantity of bit errors, and
        where the performing the forward error correction on the second recovered signal includes:
            determining a second difference between the second recovered signal and the first optical signal to obtain the second quantity of bit errors.

3. The method of claim 1,
    where the first optical signal is associated with a first polarization and a second polarization, and
    where the first polarization is orthogonal to the second polarization.

4. The method of claim 1, where filtering the signal to obtain the first recovered signal includes:
    obtaining a first index value that corresponds to the first configuration;
    setting a plurality of tap weights, associated with the filter, in a manner that corresponds to the first configuration based on the first index value,
        where the first index value identifies which tap weights, of the plurality of tap weights, are to be used to sample the signal, and
        where the plurality of tap weights are used to sample one or more bits associated with the signal; and
    filtering the signal by using the filter, set to the first configuration, to obtain the first recovered signal.

5. The method of claim 1, where performing the forward error correction on the first recovered signal includes:
    identifying the first quantity of bit errors, associated with the first recovered signal, prior to correcting bit errors associated with the first recovered signal.

6. The method of claim 1, where filtering the signal to obtain the first recovered signal includes:
    obtaining a first index value associated with a plurality of tap weights that are used to filter one or more bits associated with the signal,
        the first index value identifying which tap weights, of the plurality of tap weights, are to be used to filter the signal;
    setting at least one tap weight, of the plurality of tap weights, based on the first index value; and
    filtering the signal using the at least one tap weight to obtain the first recovered signal,
        where the filtering the signal is performed using the filter,
            the filter being associated with a feedforward carrier recovery component associated with the device.

7. The method of claim 6, where filtering the signal to obtain the second recovered signal includes:
    obtaining a second index value associated with the plurality of tap weights, where the second index value is different than the first index value;
    setting at least one other tap weight, of the plurality of tap weights, based on the second index value; and
    filtering the signal using the at least one other tap weight to obtain the second recovered signal.

8. The method of claim 1,
    where the signal is generated, by the optical receiver, as a result of processing the first optical signal received from an optical transmitter, and
    where the first recovered signal and the second recovered signal correspond to a difference in phase between a first phase, associated with the signal, and a second phase, that corresponds to the local oscillator.

9. The method of claim 1, further comprising:
    identifying, an optical phase associated with the signal, where the optical phase includes a first optical phase associated with a first polarization and a second optical phase associated with a second polarization, where the first polarization is orthogonal to the second polarization;

generating a first average of the optical phase based on a first index that identifies a manner in which the first optical phase and the second optical phase are to be averaged;

filtering the signal to obtain a first recovered signal, of the one or more recovered signals, that includes a first portion of the first average of the optical phase, where the first recovered signal corresponds to the first polarization;

obtaining a first quantity of bit errors associated with the first recovered signal;

filtering the signal to obtain a second recovered signal, of the one or more recovered signals, that includes a second portion of the first average of the optical phase, where the second recovered signal corresponds to the second polarization; and obtaining a second quantity of bit errors associated with the second recovered signal.

10. The method of claim 9, further comprising:

generating a second average of the optical phase based on a second index that identifies a different manner in which the first optical phase and the second optical phase are to be averaged;

obtaining a third recovered signal, of the one or more recovered signals, that includes a first portion of the second average of the optical phase, where the third recovered signal corresponds to the first polarization;

obtaining a third quantity of bit errors associated with the third recovered signal;

obtaining a fourth recovered signal, of the one or more recovered signals, that includes a second portion of the second average of the optical phase, where the fourth recovered signal corresponds to the second polarization;

obtaining a fourth quantity of bit errors associated with the third recovered signal.

11. The method of claim 10, further comprising:

determining whether a first sum of the first quantity of bit errors and the second quantity of bit errors is greater than a second sum of the third quantity of bit errors and the fourth quantity of bit errors;

process the signal based on the first index when the first sum is less than the second sum;

and process the signal based on the second index when the first sum is not less than the second sum.

12. A device comprising:

one or more processors to:

receive, from an optical receiver, a signal derived from a first optical signal combined with a second optical signal that is generated by a local oscillator, obtain, from the signal, a first recovered signal using a filter set up in a first configuration, identify a first quantity of bit errors associated with a first recovered signal, obtain, from the signal, a second recovered signal using the filter set up in a second configuration identify a second quantity of bit errors associated with a second recovered signal, determine that the first quantity of bit errors is greater than the second quantity of bit errors, and process the signal by using the filter set up in the second configuration based on determining that the first quantity of errors is greater than the second quantity of errors.

13. The device of claim 12, where the first recovered signal and the second recovered signal are associated with a first polarization; and where the one or more processors are further to:

obtain, from the signal, a third recovered signal using the filter set up in a third configuration, obtain, from the signal, a fourth recovered signal using the filter set up in a fourth configuration, the third recovered signal and the fourth recovered signal being associated with a second polarization, and the second polarization being orthogonal to the first polarization, identify a third quantity of bit errors associated with the third recovered signal, identify a fourth quantity of bit errors associated with the fourth recovered signal, determine that the third quantity of bit errors is greater than the fourth quantity of bit errors, and process the signal using the filter set up in the fourth configuration based on determining that the third quantity of errors is greater than the fourth quantity of errors.

14. The device of claim 12, where, when obtaining the first recovered signal, the one or more processors are to:

retrieve a first index value, the first index value corresponding to the first configuration, of the filter, that is used to obtain the first recovered signal, configure the filter to conform with the first configuration that corresponds to the first index value, and process the signal, using the filter set up in the first configuration, to generate the first recovered signal.

15. The device of claim 12, where, when obtaining the second recovered signal, the one or more processors are to:

obtain a second index value, the second index value corresponding to a second configuration of the filter, configure the filter to conform with the second configuration that corresponds to the second index value, and process the signal, using the filter set up in the second configuration, to generate the second recovered signal.

16. The device of claim 12, where identifying the first quantity of bit errors, the one more processors are to:

perform a forward error correction operation on the first recovered signal, based on one or more iterations, each iteration, of the one or more iterations, reducing a quantity of errors detected in the first recovered signal, and identify the first quantity of bit errors, associated with the first recovered signal, after performing a first iteration, of the one or more iterations, of the forward error correction operation.

17. The device of claim 12, where, when obtaining the first recovered signal, the one or more processors are to:

remove, by using the filter set up in the first configuration, a carrier phase from the signal to generate the first recovered signal.

18. The device of claim 12, where the one or more processors are further to:

obtain a first index value associated with one or more weighting factors that are used to determine a manner in which to generate a first weighted average of the optical phase associated with the signal based on a first optical phase and a second optical phase associated with the signal, where the first optical phase is associated with a first polarization, and where the second optical phase is associated with a second polarization.

19. The device of claim 18, where the one or more processor are further to:
generate a third recovered signal, associated with the first polarization, where the third recovered signal includes a first portion of the first weighted average of the first optical phase and the second optical phase, identify a third quantity of bit errors associated with the third recovered signal, generate a fourth recovered signal, associated with the second polarization, based on the first index value, where the fourth recovered signal includes a second portion of the weighted average of the first optical phase and the second optical phase, and
identify a fourth quantity of bit errors associated with the fourth recovered signal.

20. The device of claim 19, where the one or more processor are further to:
generate a fifth recovered signal, associated with the first polarization, where the fifth recovered signal includes a first portion of the a second weighted average of the first optical phase and the second optical phase, based on the second index value, identify a fifth quantity of bit errors associated with the fifth recovered signal, generate a sixth recovered signal, associated with the second polarization, where the sixth recovered signal includes a second portion of the second weighted average of the first optical phase and the second optical phase, identify a sixth quantity of bit errors associated with fourth recovered signal, determine that a first sum of the third quantity of bit errors and the fourth quantity of bit errors is greater than a second sum of the fifth quantity of bit errors and the sixth quantity of bit errors, and
process the signal based on the second index when the first sum is greater than the second sum.

21. A system comprising:
a device to:
receive, from an optical receiver, a signal derived from a first optical signal and a second optical signal generated by a local oscillator;
generate a first recovered signal based on the signal and by using a filter set up in a first configuration;
determine a first quantity of bit errors in the first recovered signal;
generate a second recovered signal based on the signal and by using the filter set up in a second configuration;
determine that the first quantity of bit errors is less than a second quantity of bit errors; and
process the signal by using the filter set up in the first configuration based on determining that the first quantity of bit errors is less than the second quantity of bit errors.

22. The system of claim 21, where, when generating the first recovered signal, the device is to:
set up the filter in the first configuration by using a tap weight.

23. The system of claim 21, where, when generating the first recovered signal, the device is to:
remove, by using the filter set up in the first configuration, a carrier phase from the signal to obtain the first recovered signal.

24. The system of claim 21,
where the first recovered signal is corrupted by a first quantity of noise, and
where, when determining the first quantity of bit errors in the first recovered signal, the device is to:
detect the first quantity of noise as the first quantity of bit errors.

25. The system of claim 21, where the device is further to:
determine that the first quantity of bit errors does not exceed a threshold of a forward error correction (FEC) processor of the device; and
correct the first quantity of bit errors based on determining that the first quantity of bit errors does not exceed the threshold.

26. The system of claim 21,
where the first optical signal is associated with a first polarization and a second polarization, and
where the first polarization is orthogonal to the second polarization.

* * * * *